United States Patent
Morton et al.

(10) Patent No.: US 12,329,605 B2
(45) Date of Patent: Jun. 17, 2025

(54) SURGICAL STABILIZER ALIGNER SETS

(71) Applicant: Align Technology, Inc., San Jose, CA (US)

(72) Inventors: John Y. Morton, San Jose, CA (US); Ken Wu, San Jose, CA (US); Juan Carlos Alvarez, Watsonville, CA (US)

(73) Assignee: Align Technology, Inc., San Jose, CA (US)

( * ) Notice: Subject to any disclaimer, the term of this patent is extended or adjusted under 35 U.S.C. 154(b) by 355 days.

(21) Appl. No.: 17/727,393

(22) Filed: Apr. 22, 2022

(65) Prior Publication Data

US 2022/0257350 A1    Aug. 18, 2022

Related U.S. Application Data

(62) Division of application No. 16/045,382, filed on Jul. 25, 2018, now Pat. No. 11,331,166.

(60) Provisional application No. 62/537,805, filed on Jul. 27, 2017.

(51) Int. Cl.
*A61C 7/36* (2006.01)
*A61C 7/00* (2006.01)
*A61C 7/08* (2006.01)

(52) U.S. Cl.
CPC ............... *A61C 7/36* (2013.01); *A61C 7/002* (2013.01); *A61C 7/08* (2013.01)

(58) Field of Classification Search
CPC ...................................................... A61C 7/36
See application file for complete search history.

(56) References Cited

U.S. PATENT DOCUMENTS

| | | | |
|---|---|---|---|
| 4,505,672 A * | 3/1985 | Kurz | A61C 7/08 433/6 |
| 5,683,244 A * | 11/1997 | Truax | A61C 7/36 433/24 |
| 5,820,368 A | 10/1998 | Wolk | |
| 6,183,248 B1 | 2/2001 | Chishti et al. | |
| 6,309,215 B1 | 10/2001 | Phan et al. | |
| 6,386,864 B1 | 5/2002 | Kuo | |
| 6,454,565 B2 | 9/2002 | Phan et al. | |
| 6,471,511 B1 | 10/2002 | Chishti et al. | |
| 6,524,101 B1 | 2/2003 | Phan et al. | |
| 6,572,372 B1 | 6/2003 | Phan et al. | |

(Continued)

*Primary Examiner* — Heidi M Eide
(74) *Attorney, Agent, or Firm* — Lowenstein Sandler LLP

(57) ABSTRACT

A set of stabilizer aligners includes an upper stabilizer aligner for an upper dental arch of a patient and a lower stabilizer aligner for a lower dental arch of the patient. The upper stabilizer aligner comprises a first set of cavities that conform to a dentition of the upper dental arch and a first set of stabilizing features. The lower stabilizer aligner comprises a second set of cavities that conform to a dentition of the lower dental arch and a second set of stabilizing features. Stabilizing features in the second set of stabilizing features are configured to contact opposing stabilizing features in the first set of stabilizing features. The upper stabilizer aligner and the lower stabilizer aligner prevent jaw movement of the patient while the upper stabilizer aligner is worn on the upper dental arch, the lower stabilizer aligner is worn on the lower dental arch, and the upper stabilizer aligner is engaged with the lower stabilizer aligner.

13 Claims, 14 Drawing Sheets

(56) References Cited

U.S. PATENT DOCUMENTS

| | | | |
|---|---|---|---|
| 6,604,527 B1* | 8/2003 | Palmisano | A61C 7/08 128/859 |
| 6,607,382 B1 | 8/2003 | Kuo et al. | |
| 6,705,863 B2 | 3/2004 | Phan et al. | |
| 6,783,604 B2 | 8/2004 | Tricca | |
| 6,790,035 B2 | 9/2004 | Tricca et al. | |
| 6,814,574 B2 | 11/2004 | Abolfathi et al. | |
| 6,830,450 B2 | 12/2004 | Knopp et al. | |
| 6,947,038 B1 | 9/2005 | Anh et al. | |
| 7,074,039 B2 | 7/2006 | Kopelman et al. | |
| 7,104,792 B2 | 9/2006 | Taub et al. | |
| 7,121,825 B2 | 10/2006 | Chishti et al. | |
| 7,160,107 B2 | 1/2007 | Kopelman et al. | |
| 7,192,273 B2 | 3/2007 | McSurdy, Jr. | |
| 7,347,688 B2 | 3/2008 | Kopelman et al. | |
| 7,354,270 B2 | 4/2008 | Abolfathi et al. | |
| 7,448,514 B2 | 11/2008 | Wen | |
| 7,481,121 B1 | 1/2009 | Cao | |
| 7,543,511 B2 | 6/2009 | Kimura et al. | |
| 7,553,157 B2 | 6/2009 | Abolfathi et al. | |
| 7,600,999 B2 | 10/2009 | Knopp | |
| 7,658,610 B2 | 2/2010 | Knopp | |
| 7,766,658 B2 | 8/2010 | Tricca et al. | |
| 7,771,195 B2 | 8/2010 | Knopp et al. | |
| 7,854,609 B2 | 12/2010 | Chen et al. | |
| 7,871,269 B2 | 1/2011 | Wu et al. | |
| 7,878,801 B2 | 2/2011 | Abolfathi et al. | |
| 7,878,805 B2 | 2/2011 | Moss et al. | |
| 7,883,334 B2 | 2/2011 | Li et al. | |
| 7,914,283 B2 | 3/2011 | Kuo | |
| 7,947,508 B2 | 5/2011 | Tricca et al. | |
| 8,152,518 B2 | 4/2012 | Kuo | |
| 8,172,569 B2 | 5/2012 | Matty et al. | |
| 8,235,715 B2 | 8/2012 | Kuo | |
| 8,292,617 B2 | 10/2012 | Brandt et al. | |
| 8,337,199 B2 | 12/2012 | Wen | |
| 8,401,686 B2 | 3/2013 | Moss et al. | |
| 8,517,726 B2 | 8/2013 | Kakavand et al. | |
| 8,562,337 B2 | 10/2013 | Kuo et al. | |
| 8,684,729 B2 | 4/2014 | Wen | |
| 8,708,697 B2 | 4/2014 | Li et al. | |
| 8,758,009 B2 | 6/2014 | Chen et al. | |
| 8,771,149 B2 | 7/2014 | Rahman et al. | |
| 8,899,976 B2 | 12/2014 | Chen et al. | |
| 8,899,977 B2 | 12/2014 | Cao et al. | |
| 8,936,463 B2 | 1/2015 | Mason et al. | |
| 8,936,464 B2 | 1/2015 | Kopelman | |
| 9,022,781 B2 | 5/2015 | Kuo et al. | |
| 9,119,691 B2 | 9/2015 | Namiranian et al. | |
| 9,161,823 B2 | 10/2015 | Morton et al. | |
| 9,241,774 B2 | 1/2016 | Li et al. | |
| 9,326,831 B2 | 5/2016 | Cheang | |
| 9,433,476 B2 | 9/2016 | Khardekar et al. | |
| 9,610,141 B2 | 4/2017 | Kopelman et al. | |
| 9,655,691 B2 | 5/2017 | Li et al. | |
| 9,675,427 B2 | 6/2017 | Kopelman | |
| 9,700,385 B2 | 7/2017 | Webber | |
| 9,744,001 B2 | 8/2017 | Choi et al. | |
| 9,844,424 B2 | 12/2017 | Wu et al. | |
| 10,045,835 B2 | 8/2018 | Boronkay et al. | |
| 10,111,730 B2 | 10/2018 | Webber et al. | |
| 10,150,244 B2 | 12/2018 | Sato et al. | |
| 10,201,409 B2 | 2/2019 | Mason et al. | |
| 10,213,277 B2 | 2/2019 | Webber et al. | |
| 10,363,116 B2 | 7/2019 | Boronkay | |
| 10,383,705 B2 | 8/2019 | Shanjani et al. | |
| D865,180 S | 10/2019 | Bauer et al. | |
| 10,449,016 B2 | 10/2019 | Kimura et al. | |
| 10,463,452 B2 | 11/2019 | Matov et al. | |
| 10,470,847 B2 | 11/2019 | Shanjani et al. | |
| 10,492,888 B2 | 12/2019 | Chen et al. | |
| 10,517,701 B2 | 12/2019 | Boronkay | |
| 10,537,463 B2 | 1/2020 | Kopelman | |
| 10,548,700 B2 | 2/2020 | Fernie | |
| 10,555,792 B2 | 2/2020 | Kopelman et al. | |
| 10,613,515 B2 | 4/2020 | Cramer et al. | |
| 10,639,134 B2 | 5/2020 | Shanjani et al. | |
| 10,743,964 B2 | 8/2020 | Wu et al. | |
| 10,758,323 B2 | 9/2020 | Kopelman | |
| 10,781,274 B2 | 9/2020 | Liska et al. | |
| 10,813,720 B2 | 10/2020 | Grove et al. | |
| 10,874,483 B2 | 12/2020 | Boronkay | |
| 10,881,487 B2 | 1/2021 | Cam et al. | |
| 10,912,629 B2 | 2/2021 | Tanugula et al. | |
| 10,959,810 B2 | 3/2021 | Li et al. | |
| 10,993,783 B2 | 5/2021 | Wu et al. | |
| 11,026,768 B2 | 6/2021 | Moss et al. | |
| 11,026,831 B2 | 6/2021 | Kuo | |
| 11,045,282 B2 | 6/2021 | Kopelman et al. | |
| 11,045,283 B2 | 6/2021 | Riley et al. | |
| 11,103,330 B2 | 8/2021 | Webber et al. | |
| 11,123,156 B2 | 9/2021 | Cam et al. | |
| 11,154,382 B2 | 10/2021 | Kopelman et al. | |
| 11,166,788 B2 | 11/2021 | Webber | |
| 11,174,338 B2 | 11/2021 | Liska et al. | |
| 11,219,506 B2 | 1/2022 | Shanjani et al. | |
| 11,259,896 B2 | 3/2022 | Matov et al. | |
| 11,273,011 B2 | 3/2022 | Shanjani et al. | |
| 11,278,375 B2 | 3/2022 | Wang et al. | |
| 11,318,667 B2 | 5/2022 | Mojdeh et al. | |
| 11,331,166 B2 | 5/2022 | Morton et al. | |
| 11,344,385 B2 | 5/2022 | Morton et al. | |
| 2002/0192617 A1 | 12/2002 | Phan et al. | |
| 2003/0207224 A1* | 11/2003 | Lotte | A61C 7/08 433/6 |
| 2004/0166462 A1 | 8/2004 | Phan et al. | |
| 2004/0166463 A1 | 8/2004 | Wen et al. | |
| 2005/0014105 A1 | 1/2005 | Abolfathi et al. | |
| 2005/0072435 A1* | 4/2005 | Eubank | A61C 7/08 128/861 |
| 2005/0186524 A1 | 8/2005 | Abolfathi et al. | |
| 2005/0244768 A1 | 11/2005 | Taub et al. | |
| 2006/0019218 A1 | 1/2006 | Kuo | |
| 2006/0078841 A1 | 4/2006 | Desimone et al. | |
| 2006/0115782 A1 | 6/2006 | Li et al. | |
| 2006/0115785 A1 | 6/2006 | Li et al. | |
| 2006/0199142 A1 | 9/2006 | Liu et al. | |
| 2006/0234179 A1 | 10/2006 | Wen et al. | |
| 2008/0118882 A1 | 5/2008 | Su | |
| 2008/0160473 A1 | 7/2008 | Li et al. | |
| 2008/0286716 A1 | 11/2008 | Sherwood | |
| 2008/0286717 A1 | 11/2008 | Sherwood | |
| 2009/0280450 A1 | 11/2009 | Kuo | |
| 2010/0055635 A1 | 3/2010 | Kakavand | |
| 2010/0129763 A1 | 5/2010 | Kuo | |
| 2014/0067334 A1 | 3/2014 | Kuo | |
| 2015/0079531 A1* | 3/2015 | Heine | A61C 7/08 433/19 |
| 2015/0238284 A1* | 8/2015 | Wu | A61C 7/002 703/1 |
| 2015/0265376 A1 | 9/2015 | Kopelman | |
| 2015/0366638 A1 | 12/2015 | Kopelman et al. | |
| 2016/0193014 A1 | 7/2016 | Morton et al. | |
| 2016/0199216 A1* | 7/2016 | Cam | A61F 5/566 128/848 |
| 2017/0007359 A1 | 1/2017 | Kopelman et al. | |
| 2017/0007360 A1 | 1/2017 | Kopelman et al. | |
| 2017/0007361 A1 | 1/2017 | Boronkay et al. | |
| 2017/0007366 A1 | 1/2017 | Kopelman et al. | |
| 2017/0007386 A1 | 1/2017 | Mason et al. | |
| 2017/0135792 A1 | 5/2017 | Webber | |
| 2017/0135793 A1 | 5/2017 | Webber et al. | |
| 2017/0165032 A1 | 6/2017 | Webber et al. | |
| 2018/0078344 A1* | 3/2018 | Falkel | A61C 7/36 |
| 2018/0360567 A1 | 12/2018 | Xue et al. | |
| 2018/0368944 A1 | 12/2018 | Sato et al. | |
| 2019/0000592 A1 | 1/2019 | Cam et al. | |
| 2019/0000593 A1 | 1/2019 | Cam et al. | |
| 2019/0021817 A1 | 1/2019 | Sato et al. | |
| 2019/0046297 A1 | 2/2019 | Kopelman et al. | |
| 2019/0099129 A1 | 4/2019 | Kopelman et al. | |
| 2019/0125494 A1 | 5/2019 | Li et al. | |
| 2019/0125497 A1 | 5/2019 | Derakhshan et al. | |
| 2019/0152152 A1 | 5/2019 | O'Leary et al. | |

(56) References Cited

U.S. PATENT DOCUMENTS

| | | |
|---|---|---|
| 2019/0175304 A1 | 6/2019 | Morton et al. |
| 2019/0262101 A1 | 8/2019 | Shanjani et al. |
| 2019/0298494 A1 | 10/2019 | Webber et al. |
| 2019/0314119 A1 | 10/2019 | Kopelman et al. |
| 2019/0343606 A1 | 11/2019 | Wu et al. |
| 2020/0000553 A1 | 1/2020 | Makarenkova et al. |
| 2020/0100864 A1 | 4/2020 | Wang et al. |
| 2020/0100865 A1 | 4/2020 | Wang et al. |
| 2020/0100866 A1 | 4/2020 | Medvinskaya et al. |
| 2020/0155276 A1 | 5/2020 | Cam et al. |
| 2020/0188062 A1 | 6/2020 | Kopelman et al. |
| 2020/0214598 A1 | 7/2020 | Li et al. |
| 2020/0214801 A1 | 7/2020 | Wang et al. |
| 2020/0390523 A1 | 12/2020 | Sato et al. |
| 2021/0078357 A1 | 3/2021 | Venkatasanthanam et al. |
| 2021/0147672 A1 | 5/2021 | Cole et al. |

\* cited by examiner

SURGICAL STABILIZER ALIGNER SETS

RELATED APPLICATIONS

The present application is a divisional application of U.S. patent application Ser. No. 16/045,382, filed Jul. 25, 2018, which claims the benefit of U.S. Provisional Patent Application No. 62/537,805 filed Jul. 27, 2017, both of which are incorporated by reference herein.

TECHNICAL FIELD

Embodiments of the present invention relate to the field of dental appliances and, in particular, to an orthodontic aligner used in conjunction with dental surgery.

BACKGROUND

Orthognathic surgery (also known as corrective jaw surgery) is surgery that corrects conditions of the jaw and face related to structure, growth, sleep apnea, malocclusion problems, temporomandibular joints (TMJ) disorders, congenital conditions such as cleft palate and/or other orthodontic problems that cannot be readily treated with standard orthodontic treatment (e.g., braces or orthodontic aligners). Orthognathic surgery can be used, for example, to treat gross jaw discrepancies (e.g., anteroposterior discrepancies, vertical discrepancies, transverse discrepancies, class III mesiocclusion, and so on) and skeletofacial discrepancies. Orthognathic surgery is performed by making cuts in the bones of the mandible and/or maxilla, and repositioning the cut pieces of bone to a desired position and alignment of the mandible and maxilla. The maxilla can be adjusted using "Lefort I" level osteotomy, and the midface can be adjusted using "Lefort II" and/or "Lefort III" osteotomy.

There are generally multiple phases associated with orthognathic surgery. These include in sequence a pre-operative orthodontic treatment that occurs prior to the surgery, the surgical procedure, a post-operative fixation period in which the jaw is fixed in place following the surgery, and a post-operative orthodontic treatment following the post-operative fixation period. The pre-operative orthodontic treatment is performed to ensure that the upper and lower jaws can be properly positioned and aligned during the surgery and the post-operative fixation period. Treatments which include a pre-operative orthodontic phase are often very long treatments, and can take up to three years.

During the post-operative fixation period, the upper and lower jaws are fixed together in a closed position by wiring the jaws shut (ligating the jaws) to ensure correct re-positioning of the bones while the bones heal. To wire the jaw closed in the desired position, a splint or cast is built out of acrylic. The splint holds the upper and lower jaw together at a fixed position while the jaw is wired shut. The patient is unable to open their mouth or move their jaw during the post-operative fixation period. Also, during the fixation period no orthodontic movement can take place since the jaw is wired shut.

While in the closed fixed position, the teeth of the upper jaw contact the teeth of the lower jaw at multiple dental contacts. The upper and lower dentition is generally adjusted during the pre-operative orthodontic treatment to place the teeth in proper position to establish the dental contacts. Accordingly, for many patients the surgical procedure typically cannot be performed until after the pre-operative orthodontic treatment has been completed.

After the post-operative fixation period is completed (generally about 10-12 weeks) and the jaw bone has healed sufficiently, post-operative orthodontic treatment can begin to align the teeth. The post-operative orthodontic treatment can take another year or so to perform. Accordingly, from start to finish, the treatment associated with orthognathic surgery can take up to four years, or even longer in some instances.

BRIEF DESCRIPTION OF THE DRAWINGS

The present invention is illustrated by way of example, and not by way of limitation, in the figures of the accompanying drawings.

DETAILED DESCRIPTION

Figure 1A:
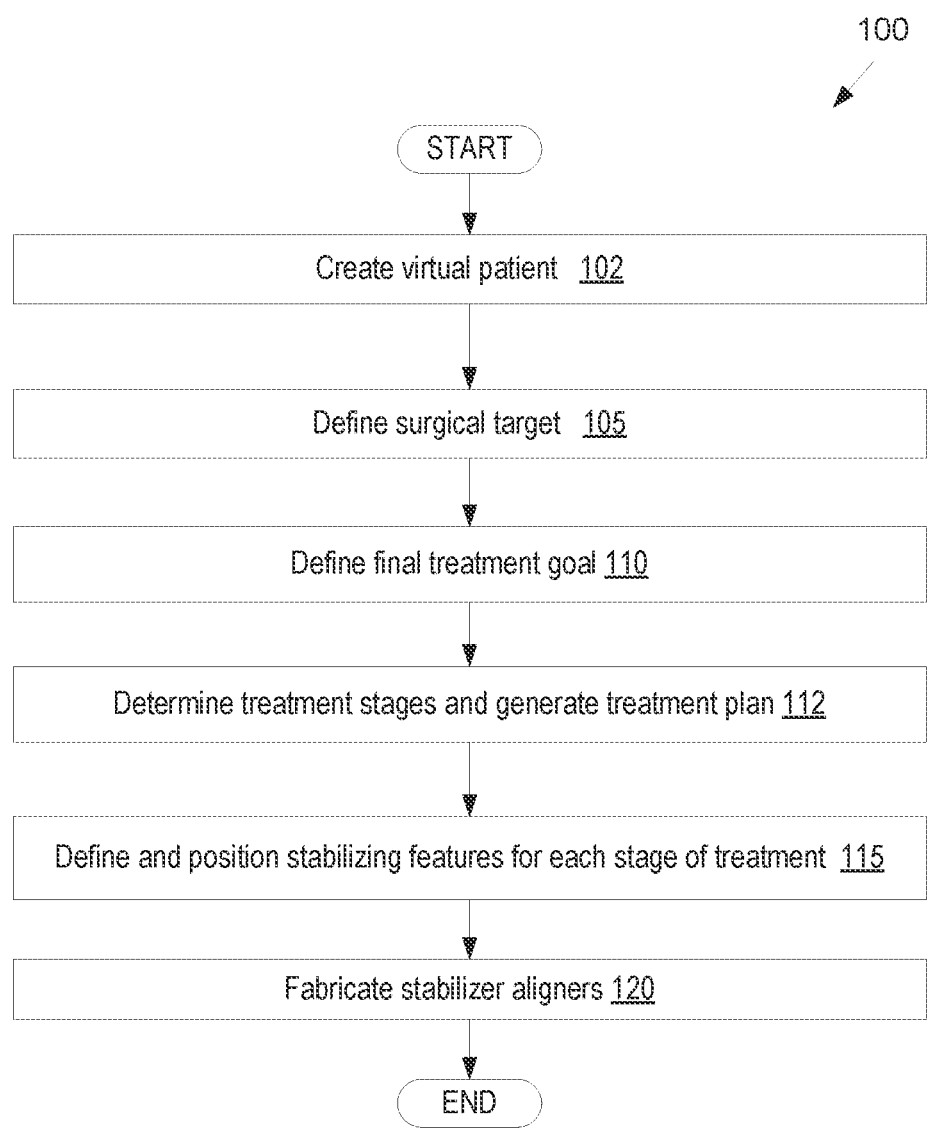
FIG. 1A illustrates a flow diagram for a method of fabricating one or more surgical stabilizer aligners, in accordance with one embodiment.

Embodiments relate to aligners that are capable of immobilizing a patient's jaw after orthognathic surgery while also applying forces to reposition a patient's teeth. Embodiments also relate to aligners that can immobilize a patient's jaw without applying forces to reposition patient's teeth. Embodiments take advantage of the accelerated physiological turnover rate in surgery first orofacial surgeries by moving orthodontic treatment into the fixation stage of treatment. Embodiments additionally provide aligners that are capable of positioning a patient's upper and lower jaws in a desired position during such orthognathic surgery. The aligners include stabilizing features incorporated therein that hold and stabilize the position and relation of the upper and lower jaw to allow healing of the bone. Additionally, orthodontic treatment of the teeth may be achieved by the stabilizer aligners while those stabilizer aligners maintain fixed positions and relation of the upper and lower jaw. During the post-operative fixation period, one or both arches can undergo active orthodontic treatment while the bone heals properly, hence shortening treatment time. The orthognathic surgery may or may not be preceded by the use of pre-surgical orthodontics to adjust a position and/or orientation of one or more teeth prior to the orthognathic surgery.

As described in the background, traditionally orthognathic surgery is preceded by pre-operative orthodontic treatment in order to position the teeth such that some of the teeth will act as dental contacts for positioning and securing the upper jaw to the lower jaw during and after the orthognathic surgery. In contrast, embodiments provide stabilizer aligners that have stabilizing features that will place the patient's upper and lower jaw in the proper positions during and/or after orthognathic surgery. Since the stabilizing features provide contacts between the upper and lower dental arches, pre-operative orthodontic treatment that is traditionally performed to place the teeth in proper position to enable the orthognathic surgery can be omitted or reduced. This can significantly reduce the lead time that generally precedes performing orthognathic surgery. For example, the pre-operative orthodontic treatment can last up to three years. By practicing embodiments described herein, orthognathic surgery can be performed immediately or shortly after a treatment plan is created without performing any pre-operative orthodontic treatment or with minimal pre-operative orthodontic movement by using aligners with stabilizing features after orthognathic surgery. Alternatively, pre-operative orthodontic treatment may be performed, followed by orthognathic surgery and the use of aligners with stabilizing features during a fixation period.

During orthognathic surgery, a surgeon may desire to place the upper and lower jaw in a desired position. This can be achieved in embodiments by providing stabilizer aligners for the patient to wear on his upper and lower dental arches during the surgery.

After orthognathic surgery, a cast or splint is generally formed in a patient's mouth to secure the upper and lower dental arches in a desired position with relation to one another. Brackets are bonded to the teeth in the upper and lower dental arches, and then wires are weaved through these brackets to ligate the jaw and wire it closed. This entire process is unpleasant and uncomfortable to the patient, and time consuming. Embodiments eliminate any need to form a cast and to wire a patient's jaw shut by providing stabilizer aligners for the patient's upper and lower dental arches. The stabilizer aligners each have stabilizing features that are configured to immobilize the jaw while an upper stabilizer aligner (worn on the upper dental arch) is engaged with a lower stabilizer aligner (worn on the lower dental arch). The upper stabilizer aligner has stabilizing features that are configured to contact stabilizing features on the lower stabilizer aligner. In embodiments, the stabilizing features are configured with different planes of orientation so that in the aggregate they prevent the jaw from moving. The upper and lower stabilizer aligners may each include anchor points such as elastic retention features for elastics (e.g., rubber bands). The elastics may be applied to the elastic retention features (or other anchor points) in the upper and lower stabilizer aligners to apply a force that secures the upper stabilizer aligner against the lower stabilizer aligner. Alternatively, anchor points such as buttons may be bonded to patient teeth, and the upper and lower stabilizer aligners may be cut in a manner that exposes the anchor points. The elastics may then be applied to the exposed anchor points to apply a force that secures the upper stabilizer aligner against the lower stabilizer aligner. The stabilizer aligners and elastics may serve the function that is traditionally served by wiring the jaw shut. However, since the stabilizer aligners are pre-fabricated, it takes only a matter of seconds to less than a minute to apply the stabilizer aligners to the upper and lower dental arches and apply the elastics to the aligners.

Another advantage of the stabilizer aligners is that the stabilizer aligners can apply forces to reposition teeth during the post-operative fixation period. Without the stabilizer aligners, a patient would need to wait until the post-operative fixation period is ended and the jaw is healed before proceeding with a post-operative orthodontic treatment. However, the stabilizer aligners can begin the post-operative orthodontic treatment during the post-operative fixation period. This has particular advantages because of physiological changes that a patient undergoes during the post-operative fixation period. Specifically, a patient experiences a heightened physiological turnover rate that is induced by the body healing from the surgical procedure during the post-operative fixation period. There is trauma that is introduced to the patient (e.g., by cutting bone in the face and jaw) which causes the cellular mechanisms associated with tooth repositioning to speed up significantly. As a result, the teeth can be repositioned at a much faster rate of movement than is normally achievable in orthodontics. This can significantly reduce the time required to perform the post-operative orthodontic treatment.

In the aggregate, the stabilizer aligners can therefore eliminate or minimize pre-operative orthodontic treatment, eliminate a need to apply a cast to the patient's jaw, eliminate a need to wire the patient's jaw shut, and significantly reduce the duration of post-operative orthodontic treatment.

Referring now to the figures, FIG. 1A illustrates a flow diagram for a method 100 of fabricating one or more surgical stabilizer aligners, in accordance with one embodiment. One or more operations of method 100 are performed by processing logic of a computing device. The processing logic may include hardware (e.g., circuitry, dedicated logic, programmable logic, microcode, etc.), software (e.g., instructions executed by a processing device), firmware, or a combination thereof. For example, one or more operations of method 100 may be performed by a processing device executing a computer aided drafting (CAD) program or module such as stabilizer aligner module 750 of FIG. 7.

At block 102 of method 100, a virtual patient is created. A virtual patient is a digital file, database entry, or data structure that represents a patient. The virtual patient may include patient data, photographs, a virtual 3D model of a patient's dental arches, x-ray images of a patient's dentition, and so on. The virtual patient may be created based on input data in the form of intraoral scan data, a PVS (polyvinyl siloxane) impression or the like, (e.g., a PVS file or a 3DM file), a sterolithography (STL) file, an align design file (ADF), digital photographs (e.g., JPG files, BMP files, PNG files, and so on), stereo photos, videos (e.g., MPEG files), x-ray images (e.g., cone beam computerized tomography CBCT scan) and/or other input data. If a virtual 3D model of the patient's upper and lower dental arches are not yet included in the virtual patient, then such virtual 3D models may be generated from the input data.

In an example, an intraoral scan of the patient's dental arches may be performed to generate a three dimensional (3D) virtual model of the patient's upper and lower dental arches. For example, a full scan of the mandibular and/or maxillary arches of a patient may be performed to generate 3D virtual models thereof. The intraoral scan may be performed by creating multiple overlapping intraoral images from different scanning stations and then stitching together the intraoral images to provide a composite 3D virtual model. In other applications, virtual 3D models may also be generated based on scans of an object to be modeled or based on use of computer aided drafting techniques (e.g., to design the virtual 3D mold). Alternatively, an initial negative mold may be generated from an actual object to be modeled (e.g., a mold may be taken of a patient's dental arches). The negative mold may then be scanned to determine a shape of a positive mold that will be produced.

At block 105, a surgical target may be defined. The surgical target comprises a target position of the upper and lower jaw, including a target relationship in position and orientation between the upper and lower jaw. The surgical target is the target position, orientation and relationship for and between the upper and lower dental arches after the orthognathic surgery. The surgical target defines the starting point for orthodontic treatment and the shapes of the upper and lower dental arches, and the fixed relationship between the upper and lower dental arch, during a post-operative fixation period.

In one embodiment, the surgical target is defined as part of a treatment plan prior to orthognathic surgery being performed. In another embodiment, the surgical target may be defined by performing an intraoral scan of the patient's upper and/or lower dental arches after orthognathic surgery has been performed.

After the surgery, the teeth will still be misaligned, but the stabilizer aligners hold the upper and lower jaw in the target position and orientation. Accordingly, once the surgical target is defined (either by having the surgical target defined in a treatment plan or by imaging the dental arches after orthognathic surgery has been performed), at block 110 a final treatment goal is defined. The final treatment goal is the target dental positions and orientations for the patient's teeth. At block 112, a sequence of treatment stages are determined to reposition the teeth from the starting dentition defined from the surgical target at block 105 to the final treatment goal defined at block 110. This may include determining a number of treatment stages that should be used to cause the teeth to progress from starting positions and orientations to the target final positions and orientations. Each treatment stage will move the patient's teeth slightly toward the final treatment goal. The shape of the final virtual 3D model and each intermediate virtual 3D model may be determined by computing the progression of tooth movement throughout orthodontic treatment from initial tooth placement and orientation to final corrected tooth placement and orientation. For each treatment stage, a separate virtual 3D model of the patient's dental arches at that treatment stage may be generated. The shape of each virtual 3D model will be different. The original virtual 3D model, the final virtual 3D model and each intermediate virtual 3D model is unique and customized to the patient. A treatment plan may be generated that includes the surgical target, final treatment goal and each of the treatment stages (including the virtual 3D models of the arches at each treatment stage).

Accordingly, multiple different virtual 3D models may be generated for a single patient. A first pair of virtual 3D models may be a unique pair of models of a patient's dental arches and/or teeth as they will exist after the surgery, and a final virtual 3D model may be a model of the patient's dental arch and/or teeth after both surgery and orthodontic correction of one or more teeth and/or a jaw. Multiple intermediate virtual 3D models may be modeled, each of which may be incrementally different from previous virtual 3D models.

At block 115, stabilizing features are defined and placed into the virtual 3D models for the upper and lower dental arches for one or more of the treatment stages. The stabilizing features each provide an artificial fixation or contact. A virtual 3D model for a dental arch should include at least three stabilizing features if no dental contacts are to be used. If the patient's dentition allows for one or more dental contacts to facilitate fixation during the fixation period for a treatment stage, then fewer than three stabilizing features may be used. The more stabilizing features that are used, the greater the level of stability in some embodiments. Accordingly, in some embodiments, up to 7 or more stabilizing features may be used for a treatment stage. The stabilizing features fix the positions of the upper and lower jaw without depending on the shapes, positions and orientations of the teeth. Accordingly, as the teeth are moved by the aligners, the positions of the upper and lower jaws may remain fixed due to the stabilizing features in the aligners at the different treatment stages.

Stabilizing features may be added to virtual 3D models for multiple different treatment stages. The stabilizing features may be designed such that they are reduced in size and/or height as treatment progresses (e.g., at each subsequent treatment stage). For example, a first set of stabilizing features for a first treatment stage may have approximately the same shape and/or placement as a corresponding second set of stabilizing features for a subsequent second treatment stage. However, the stabilizing features in the second set of stabilizing features may have a smaller size than the corresponding stabilizing features in the first set of stabilizing features. Such a reduction allows for the jaws to come closer to occlusion in a more natural anatomical relation. The importance of the contacts of the aligner occlusal surfaces may become more important in controlling the jaw relation (relation between the upper and lower jaw) in subsequent treatment stages, and the stabilizing features play less of a role in this relation in the subsequent treatment stages.

Once a set of stabilizing aligners is added to the virtual 3D models, one or more tests may be performed to test a stability of the stabilizer aligners and an ability of the stabilizer aligners to prevent jaw movement while the stabilizer aligners are worn by the patient and the upper dental arch of the patient is engaged with the lower dental arch of the patient. Such tests are described below with reference to FIG. 1B. Responsive to a determination that the one or more first stabilizing features and the one or more second stabilizing features will prevent the jaw movement, processing logic may store a modified first virtual 3D model comprising a dentition for the upper arch at a treatment stage and one or more first stabilizing features for the upper arch and may store a modified second virtual 3D model comprising a dentition for the lower arch at the treatment stage and one or more second stabilizing features for the lower arch.

Each virtual 3D model of a patient's dental arch (e.g., each virtual 3D model that has been modified to include stabilizing features) may be used to generate a unique customized mold of the dental arch at a particular stage of treatment. The shape of the mold may be at least in part based on the shape of the virtual 3D model for that treatment stage.

At block 120, stabilizer aligners are fabricated based on the virtual 3D models of the dental arches for one or more treatment stages. In one embodiment, rapid prototyping (e.g., stereo lithography) is performed to form physical molds from the virtual 3D models for one or more treatment stages. One example of a rapid prototyping manufacturing machine is a 3D printer. 3D Printing includes any layer-based additive manufacturing processes. 3D printing may be achieved using an additive process, where successive layers of material are formed in proscribed shapes. 3D printing may be performed using extrusion deposition, granular materials binding, lamination, photopolymerization, continuous liquid interface production (CLIP), or other techniques. 3D printing may also be achieved using a subtractive process, such as milling.

In one embodiment, stereolithography (SLA), also known as optical fabrication solid imaging, is used to fabricate an SLA mold. In SLA, the mold is fabricated by successively printing thin layers of a photo-curable material (e.g., a polymeric resin) on top of one another. A platform rests in a bath of a liquid photopolymer or resin just below a surface of the bath. A light source (e.g., an ultraviolet laser) traces a pattern over the platform, curing the photopolymer where the light source is directed, to form a first layer of the mold. The platform is lowered incrementally, and the light source traces a new pattern over the platform to form another layer of the mold at each increment. This process repeats until the mold is completely fabricated. Once all of the layers of the mold are formed, the mold may be cleaned and cured.

Materials such as a polyester, a co-polyester, a polycarbonate, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, a thermoplastic polyamide elastomer, or combinations thereof, may be used to directly form the mold. The materials used for fabrication of the mold can be provided in an uncured form (e.g., as a liquid, resin, powder, etc.) and can be cured (e.g., by photopolymerization, light curing, gas curing, laser curing, crosslinking, etc.). The properties of the material before curing may differ from the properties of the material after curing.

Aligners may be formed from each mold to provide forces to move the patient's teeth. The shape of each aligner is unique and customized for a particular patient and a particular treatment stage. In an example, the aligners can be pressure formed or thermoformed over the molds. In one embodiment, a sheet of material is pressure formed or thermoformed over the mold. The sheet may be, for example, a sheet of plastic (e.g., an elastic thermoplastic, a sheet of polymeric material, etc.). To thermoform the aligner over the mold, the sheet of material may be heated to a temperature at which the sheet becomes pliable. Pressure may concurrently be applied to the sheet to form the now pliable sheet around the mold with the features that will imprint the markings and/or elements in the aligner. Once the sheet cools, it will have a shape that conforms to the mold. In one embodiment, a release agent (e.g., a non-stick material) is applied to the mold before forming the aligner. This may facilitate later removal of the mold from the aligner. After thermoforming, the aligner may be trimmed at a cut line that is near to a gingival line of the patient.

Each mold may be used to fabricate an aligner that will apply forces to the patient's teeth at a particular stage of the orthodontic treatment. Each mold may additionally include stabilizing features that will stabilize the upper and lower dental arches during the post-operative fixation period and/or during the surgery. The aligners each have teeth-receiving cavities that receive and resiliently reposition the teeth in accordance with a particular treatment stage. Teeth may be repositioned by the stabilizer aligners by, for example, moving one or more teeth vertically, rotating one or more teeth, moving one or more teeth in a transverse direction relative to the dental arch, and/or moving one or more teeth in an anterior-posterior direction relative to the dental arch. The aligners additionally have stabilization features that will maintain target positions and orientation of the upper and lower jaw during the post-operative fixation period.

In one embodiment, the aligners are formed directly from the virtual 3D models using rapid prototyping techniques. In such an embodiment, a physical model of the dental arch may not be generated, and thermoforming may not be performed. Materials such as a polyester, a co-polyester, a polycarbonate, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, a thermoplastic polyamide elastomer, or combinations thereof, may be used to directly form the aligner. The materials used for direct fabrication can be provided in an uncured form (e.g., as a liquid, resin, powder, etc.) and can be cured (e.g., by photopolymerization, light curing, gas curing, laser curing, crosslinking, etc.). The properties of the material before curing may differ from the properties of the material after curing. Once cured, the materials herein can exhibit sufficient strength, stiffness, durability, biocompatibility, etc. for use in the aligner. The post-curing properties of the materials used can be selected according to the desired properties for the corresponding portions of the aligner.

In some embodiments, relatively rigid portions of the aligner can be formed via direct fabrication using one or more of the following materials: a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, and/or a polytrimethylene terephthalate. In some embodiments, relatively elastic portions of the aligner can be formed via direct fabrication using one or more of the following materials: a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, and/or a thermoplastic polyamide elastomer.

Optionally, the direct fabrication methods described herein allow for fabrication of an aligner including multiple materials, referred to herein as "multi-material direct fabrication." In some embodiments, a multi-material direct fabrication method involves concurrently forming an object from multiple materials in a single manufacturing step. For instance, a multi-tip extrusion apparatus can be used to selectively dispense multiple types of materials (e.g., resins, liquid, solids, or combinations thereof) from distinct material supply sources in order to fabricate an object from a plurality of different materials. Alternatively or in combination, a multi-material direct fabrication method can involve forming an object from multiple materials in a plurality of sequential manufacturing steps. For instance, a first portion of the object (e.g., a body of the aligner) can be formed from a first material in accordance with any of the direct fabrication methods herein, then a second portion of the object (e.g., markings for a cut line) can be formed from a second material in accordance with methods herein, and so on, until the entirety of the object has been formed. The relative arrangement of the first and second portions can be varied as desired, e.g., the first portion can be partially or wholly encapsulated by the second portion of the object. In one embodiment, multi-material direct fabrication is used to cause a first material to be used for the markings of the cut line on the aligner, and to cause one or more additional materials to be used for the remainder of the aligner.

Once the stabilizer aligners are fabricated, engagement features may be formed in the stabilizer aligners. This may include forming elastic retention features such as cuts in the aligners that will hold elastics. Alternatively, or additionally, engagement features may be included in the virtual 3D model, and may be therefore included in the stabilizer aligner after thermoforming is performed. In some embodiments, screws (e.g., a temporary anchorage device (TAD)) may be placed in a patient's skeleton, and elastics may join one or both of the aligners to the screws in the patient's skeleton. Processing logic may determine the placement of one or more TADS to be inserted into the upper and/or lower dental arch. Stabilizer aligners may have cutouts to expose the TADs or screws and/or may be configured to contact the TADs or screws. Additionally, or alternatively, a button or other attachment may be bonded to one or more teeth. Aligners may be provided with cutouts that expose the buttons, attachments, screws, TADs, etc. Elastics may then be secured to the buttons, attachments, screws, TADS, etc. and used to pull the jaw closed. Additionally, or alternatively, elastics may join the upper aligner to the lower aligner to hold the jaw shut. For example, buttons may be bonded to the upper and lower aligners, and elastics may be applied between the buttons on the upper aligners and the buttons on the lower aligners. Each elastic retention feature may be configured to receive an end of an elastic. The elastic then pulls the upper stabilizer aligner closed against the second stabilizer aligner. Thus, one or both jaws may be secured with respect to the skeleton and/or both jaws may be secured with respect to one another.

In an alternative embodiment, the upper and lower aligners may have catches formed therein to secure the aligners together during the fixation period. For example, the upper and lower aligners may have a ball and cup clasp, where one of the aligners has one or more balls and the other aligner has one or more cups.

If the surgical target is defined via a treatment plan, there is a chance that the dental arches after orthognathic surgery will not align with the surgical target. For example, a surgeon may cut more or less bone than was called for in the treatment plan, which may cause the maxilla to mandibular relationship to be off by up to about 2 mm. As a result, the stabilizer aligners designed to be used immediately after orthognathic surgery may not fit the patient's dental arches. To account for the possibility of such error or inaccuracy introduced during orthognathic surgery, in one embodiment multiple different virtual 3D models of the upper and lower dental arches may be generated for the post-surgery dentition. A first virtual 3D model may correspond to the surgical target. A second, third, fourth, etc. virtual 3D model may correspond to the surgical target with an offset of up to about 2 mm in one or more directions. A set of post-treatment stabilizer aligners may then be generated from the different virtual 3D models. If the post-treatment dentition does not align with the surgical target that was included in the treatment plan, then the additional stabilizer aligners may be tested on the patient, and one of the stabilizer aligners may correspond to the actual surgery result.

In some embodiments in which the stabilizer aligners were manufactured prior to the orthognathic surgery, the post-surgery jaw alignment will not correspond to surgical target. Accordingly, after the orthognathic surgery is performed an intraoral scan may then be performed to capture the post-surgery alignment between the maxilla and mandibular jaw. A new virtual 3D model of the post-surgery dental arches may be generated, which may then be compared to the surgical target as defined in the treatment plan. If the post-surgery dental arches correspond to the original surgical target, then the already manufactured stabilizer aligners may be used. If the post-surgery dental arches do not correspond to the original surgical target, then operations of blocks 105-120 may then be performed a second time using virtual 3D models of the post-surgery dental arches as the starting point for the orthodontic treatment. One or more new stabilizer aligners may then be generated. The patient may be fit with a retainer to retain their upper and lower jaw in a closed position until the new stabilizer aligners are ready for use.

Figure 1B:
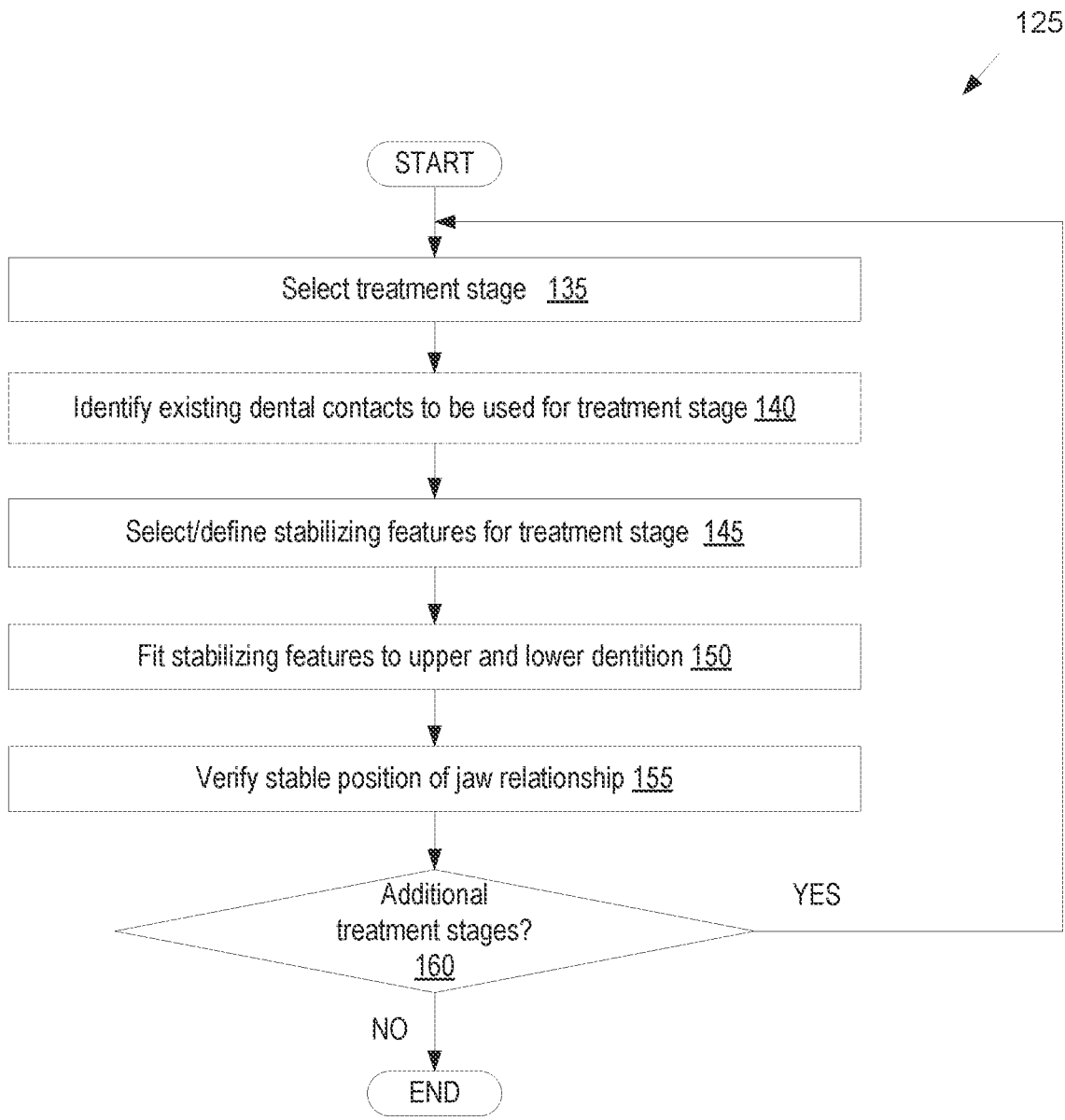
FIG. 1B illustrates a flow diagram for an additional method of fabricating one or more surgical stabilizer aligners, in accordance with one embodiment.

FIG. 1B illustrates a flow diagram for an additional method 125 of fabricating one or more surgical stabilizer aligners, in accordance with one embodiment. One or more operations of method 125 are performed by processing logic of a computing device. The processing logic may include hardware (e.g., circuitry, dedicated logic, programmable logic, microcode, etc.), software (e.g., instructions executed by a processing device), firmware, or a combination thereof. For example, one or more operations of method 125 may be performed by a processing device executing a computer aided drafting (CAD) program or module such as stabilizer aligner module 750 of FIG. 7. Method 125 may be performed at block 115 of method 100 in some embodiments.

At block 135 of method 125, a treatment stage is selected. The treatment stage may be a first treatment stage that corresponds to a surgical target, an intermediate treatment stage, or a final treatment stage that corresponds to a desired final position and orientation of a patient's teeth. The final treatment stage may also correspond to movement past a desired position and orientation, and the teeth might move back to the desired final position and orientation after the final treatment stage is completed. Once a treatment stage is selected, the virtual 3D models for the upper and lower dental arch will be shown for that treatment stage. These dental arches will be shown having the target relative positions and orientations.

At block 140, one or more existing dental contacts and/or TADs that will function as stabilizing points of contact between the upper and lower dental arches may be identified for a given treatment stage. Alternatively, there may be no teeth or TADs that will function as stabilizing contact points for a given treatment stage. Additionally, in some embodiments dental contacts will not be used as stabilizing contacts even if they could be. Artificial contacts may be preferred in some embodiments because such artificial contacts (stabilizing features) may provide more stability than dental contacts. Moreover, artificial contacts may be larger in dimension than dental contacts and have larger contacting surfaces (that contact with artificial contacts on the stabilizer aligner worn on the opposing dental arch). Additionally, it should be noted that even if a tooth is usable as a dental contact in one stage, that tooth may not be usable as a dental contact in a next stage due to tooth movement.

At block 145, one or more stabilizing features are selected and/or defined for the treatment stage. In one embodiment, processing logic may provide a library of stabilizing features. Processing logic may automatically select stabilizing contacts from the library. Alternatively, a user may manually select a stabilizing feature from the library. A user may also manually define a new stabilizing feature rather than selecting one from a library. Stabilizing features may be selected in pairs or larger groups or sets of 4, 6, 8, 10, 12, or more stabilizing features. For example, a pair of stabilizing features may include a stabilizing feature for the upper jaw and an opposing stabilizing feature for the lower jaw. A set of 4 stabilizing features may include a first pair of opposing stabilizing features and a second pair of opposing stabilizing features. A set of 8 stabilizing features may include four pairs of opposing stabilizing features.

At block 150, the stabilizing features are fit to the upper and lower dental arches in the virtual 3D models for the treatment stage. This may include moving the stabilizing features, rotating the stabilizing features, resizing the stabilizing features, adjusting the shape of stabilizing features, and so on. A pair of stabilizing features may be positioned, oriented, and scaled as a unit in some embodiments. They may then be separated, so that one stabilizing feature is added to the virtual model for the upper arch and the opposing stabilizing feature is added to the virtual model for the lower arch. Similarly, a group of two pairs, four pairs, etc. of stabilizing features (called an upper and lower match set) may be selected as a unit, and may be scaled, positioned and rotated together. The group of four, eight, etc. stabilizing features may have a pre-tested orientation and/or a fixed relationship with respect to one another that is known to be stable. The group of eight stabilizing features may be selected, where the eight stabilizing features include four upper stabilizing features to be applied to the upper dental arch and four opposing lower stabilizing features to be applied to the lower dental arch. The group of two or more stabilizing features may each have a predetermined arrangement (e.g., spacing, orientation, position, etc.) with relation to one another. The group of two or more stabilizing features may be positioned as a single entity on the upper and lower dental arches. The group of stabilizing features may also be sized and/or rotated as a group. Thus, the process of selecting and/or defining a stable set of stabilizing features may be simplified. Once the group of stabilizing features is placed, the group may be exploded into individual stabilizing features that each become part of the upper or lower dental arch virtual 3D model.

In one embodiment, once stabilizing features are set for a single treatment stage (e.g., for a single virtual 3D model associated with a treatment stage), that same set of stabilizing features may be applied to the other treatment stages as well. For example, after a group of eight stabilizing features is applied to a single treatment stage with a particular placement and orientation, that same group of eight stabilizing features may then be applied to the other treatment stages with the same or a similar placement and/or orientation. This may reduce the amount of time that it takes to generate virtual models used to manufacture the stabilizer aligners.

It should be noted that each treatment stage has a unique arrangement of teeth positions and orientations. Between each treatment stage the teeth are moving, and tooth contacts change. Accordingly, the bite plane that would be used without stabilizing features may be different at each treatment stage. However, even if the teeth are moved up or down, rotated, shifted, etc., the relation of the stabilizing features to the teeth may be adjusted to maintain target contact points and a target jaw alignment and of the upper and lower jaw. Such adjustment of the stabilizing features may be performed automatically or with user input.

In one embodiment, once stabilizing features are set for a single treatment stage and applied to other treatment stages, the stabilizing features are automatically adjusted to account for changes in tooth positioning, orientation, etc. Such adjustments can include rotating one or more stabilizing features, moving one or more stabilizing features up or down, and so on. The treatment plan may include a target fixed relation between the upper and lower jaw (e.g., as set in a first treatment stage), and processing logic may automatically adjust the stabilizing features for one or more other treatment stages to maintain the target fixed relation. For example, if a tooth is raised or lowered, then a stabilizing feature contacting that tooth may be lowered or raised accordingly to maintain the same relative position with relation to the opposing jaw.

In addition to automatically orienting and/or positioning stabilizing features for additional treatment stages after they have been set for a first treatment stage, processing logic may also automatically resize stabilizing features. Stabilizing features may be reduced in size with later stages of treatment until eventually they are no longer included at some treatment stage. Such a reduction allows for the jaws to come closer to occlusion in a more natural anatomical relation. The importance of the contacts of the aligner occlusal surfaces may become more important in controlling the jaw relation (relation between the upper and lower jaw) in subsequent treatment stages, and the stabilizer features play less of a role in this relation in the subsequent treatment stages.

In one embodiment, the stabilizing features are designed for sequential contacting. In sequential contacting, a first pair of opposing stabilizing features comes into contact, then a next pair of opposing stabilizing features comes into contact, and so on until all of the opposing stabilizing features have come into contact. The first contact helps to guide the next pair of stabilizing features to correctly contact, and so on. In such an embodiment, the first pair of opposing stabilizing features may have a lower level of stability to provide for a play in movement to enable the next contact points to be found. However, once all of the points of contact have been made, then the jaw is stabilized. This enables the stabilizing features to act together as a cradle, and makes it comfortable to find the correct contact positions for the upper and lower aligners.

In the aggregate the pairs of opposing stabilizing features should stabilize the patient's jaw in at least three planes and eliminate rigid body movement of the jaw. To ensure such stability, the stability provided by the stabilizing features may be tested.

At block 155, processing logic verifies a stable position of the jaw relationship based on the upper and lower dental arches that include the added stabilizing features. In other words, processing logic may test whether the jaw will be immobilized by the stabilizing features and/or dental contacts. Pairs of stabilizing features (that will come into contact with each other) may have a shared contact surface (e.g., a relatively large surface at the same angle). Alternatively, one or more pairs of opposing stabilizing features may have a shared contact line or a shared contact point. Each pair of stabilizing features may have a surface (or a line on a surface or a point on a surface) that defines a different plane from other pairs of stabilizing features. For example, a first stabilizing feature on the lower arch and corresponding first stabilizing feature on the upper arch may slope inward lingually. A second stabilizing feature on the lower arch and corresponding second stabilizing feature on the upper arch may slope outward buccally. Accordingly, the two pairs of stabilizing features will in combination resist movement of the mandible in multiple directions. In one embodiment, the pairs of stabilizing features are defined and positioned such that together they resist motion in three or more planes.

In one embodiment, stability is tested by performing a series of tests. A rotation test may be performed for each pair of contacting stabilizing features. For each pair of contacting features, a center of the surface of one of the features may be identified. Alternatively, surface at a point of contact between the pair of opposing stabilizing features may be identified. One of the dental arches may then be rotated about a vector that is normal to the surface. This may be performed for each stabilizing feature to determine whether any of the stabilizing features line up on an axis of rotation (have a common axis of rotation). If they do line up on an axis of rotation, then they are not stable. One center of the surface of each pair of stabilizer surfaces (or one point of contact between each pair of stabilizing features) may be used as a fulcrum point, and the software attempts to shift the position of the opposing arch in any direction about this fulcrum. If this shift in movement is possible the features are not stable and it may be determined that the stabilizing features will not prevent jaw movement.

Additionally, the stabilizing features may be compared to ensure that none of the pairs of stabilizing features has a plane that is collinear with the plane of any other pair of stabilizing features (e.g., has an axis normal to the surface that is collinear with an axis normal to any other stabilizing feature surface). The planes may be determined based on the centers of surfaces of stabilizing features from each pair of stabilizing features. Alternatively, the planes may be determined based on the contact points for each pair of stabilizing features. The vectors normal to these surfaces should all point in different directions, and should each be comprised of different combinations of transverse, sagittal and vertical components. This ensures that the jaw will be locked to prevent transverse motion, A-P motion, vertical motion and rotation. In one embodiment, the engagement surfaces of the stabilizing features are relatively large, which helps to lock in the upper and lower jaw to a specific position, orientation and relationship.

In one embodiment, the vector normal to the surface of each stabilizing feature is tested to ensure that it has a transverse component, a sagittal component and a vertical component. If so, then this test is passed. The stabilizing features may be tested by selecting a point on a surface of one of the stabilizing features for each pair of opposing stabilizing features. The selected point may be a point of contact between the pair of opposing stabilizing features. A vector that is normal to the surface at the point may be determined. Processing logic may then determine whether the vector include a transverse component, a sagittal component and a vertical component. If the determined vector for any pair of stabilizing features lacks one of a transverse component, a sagittal component or a vertical component, then a determination may be made that the stabilizing features are not guaranteed to prevent jaw movement.

In one embodiment, a minor perturbation is made to one of the dental arches (e.g., one of the virtual 3D models) parallel to the occlusal plane. Processing logic or a user then determines changes in contact points after the perturbation. If one or more stabilizing feature increases contact (or overlaps to a physically impossible contact), then the jaw is stable on that plane. In other words, the minor perturbation should create a physical intersection one surface to another surface (tooth surface or stabilizing feature surface). If the shift takes place and no two surfaces have intersected, then an instability is detected. Multiple perturbations may be performed in different directions that are parallel to the occlusal plane. This test may be performed on one or more additional planes as well. Accordingly, similar perturbations may be performed in other planes as well to test for stability in those planes.

In some embodiments, contacting stabilizing features do not have to meet at a plane, but can meet at a line. Ideally two stabilizing features will have intersecting planes. However, it may be acceptable to have two planes of opposing stabilizing features to intersect at a line. In some embodiments, contacting stabilizing features can meet at a point. However, it may be acceptable to have two planes of opposing stabilizing features to intersect at a point. The point typically includes the edge corner of one or more flat surfaces.

In one embodiment, stabilizing features are further validated by verifying that a thermoplastic can be successfully thermoformed over a mold that includes the stabilizing features. For example, if a stabilizing feature extends too far above the teeth in the virtual 3D model, then thermoforming will be unsuccessful. Validating that a thermoplastic can be successfully thermoformed over the mold manufactured from a virtual 3D model that includes the stabilizing features may include measuring a distance between a top of the stabilizing features and a top of a tooth connected to the stabilizing feature. If the distance exceeds a threshold, then it may be determined that thermoforming will be unsuccessful.

The operations of blocks 140-155 may be performed manually by a user or automatically by processing logic. For example, processing logic may use a trial and error technique to test multiple different configurations of stabilizing features until a set of stabilizing features is identified that is acceptable.

There may be multiple orientations of the upper and lower arch which are stable naturally. With upper and lower virtual 3D models, physical models, or stabilizer aligners, one may reposition them to find many stable "locking" positions for some patients. The target relation of the upper to lower dental arch should be easily identifiable by the patient when biting and engaging the elastics. In embodiments, processing logic minimizes the probability that the patient will engage a bite in one of these erroneous locking positions.

The size and orientations of the stabilizing features may be selected to allow the patient to easily identify the correct relation of the upper and lower dental arches (and the upper and lower stabilizer aligners). In one embodiment, one or more additional stabilizing tests are performed to determine whether there are additional stable relative positions of the upper stabilizer to the lower stabilizer and/or to determine the difficulty of finding the correct relative position of the upper stabilizer aligner to the lower stabilizer aligner. In one embodiment, one or more of the aforementioned tests for the stabilizing features (stabilizing tests) are performed for alternate relative positions of the upper stabilizer aligner to the lower stabilizer aligner. Processing logic may select alternative starting positions of the upper and lower dental arch, and may then perform one or more of the above stabilizing tests at the alternative starting position to determine whether that alternative starting position is stable. A determination may then be made as to whether it will be as easy for a patient to achieve the alternative stable state as the target (correct) stable state. If a determination is made that it is as easy to achieve the alternative (incorrect) stable resting position of the upper and lower dental arch as the correct stable resting position, then the size and/or orientation of one or more of the stabilizing features (e.g., of a pair of stabilizing features or multiple pairs of stabilizing features) may be altered to improve identification and probability of successful engagement.

At block 160, a determination is made as to whether there are any additional treatment stages for which stabilizing features should be added. If so, the method returns to block 135 and a next treatment stage is selected. Otherwise the method ends. It should be noted that each treatment stage is different. Accordingly, the size, shape, orientation and position of the stabilizing features should be separately determined and tested for each treatment stage to make sure that the target position and orientation of the upper and lower jaw will remain stable at that treatment stage. Embodiments enable jaw fixation and orthodontic treatment to be performed in parallel (at the same time) using the stabilizer aligners. The teeth can change position and orientation with each stage, and the stabilizing features can be adjusted between stages to ensure that the upper and lower jaw retain the same target fixed relative positions.

In one embodiment, the number of stabilizing features is higher at first, and is reduced between one or more stages. For example, 7 stabilizing features may be used in a first stage, and 3 stabilizing features may be used in a tenth stage of treatment.

In one embodiment, the vertical size of the stabilizing features is reduced between stages. The diminishing thickness or vertical size of the stabilizing features enables the jaw to close more and more with each stage, until the normal occlusal surfaces of the upper and lower jaw intersect and provide occlusal stability. Eventually the stabilizing features disappear entirely (e.g., at the end of the fixation period).

In one embodiment, a thickness of the aligner is compensated for in the design of the stabilizing features. Accordingly, the vertical height of the stabilizing features may be slightly reduced in the virtual 3D models such that there is a gap between the opposing stabilizing features. The gap will be filled by the thickness of the aligners once they are formed. In one embodiment, a strength of one or more stabilizing features is augmented to resist deformation from bite force, such as by adding a filler material into a cavity in the stabilizer aligner that is associated with a stabilizing feature.

Figure 2:
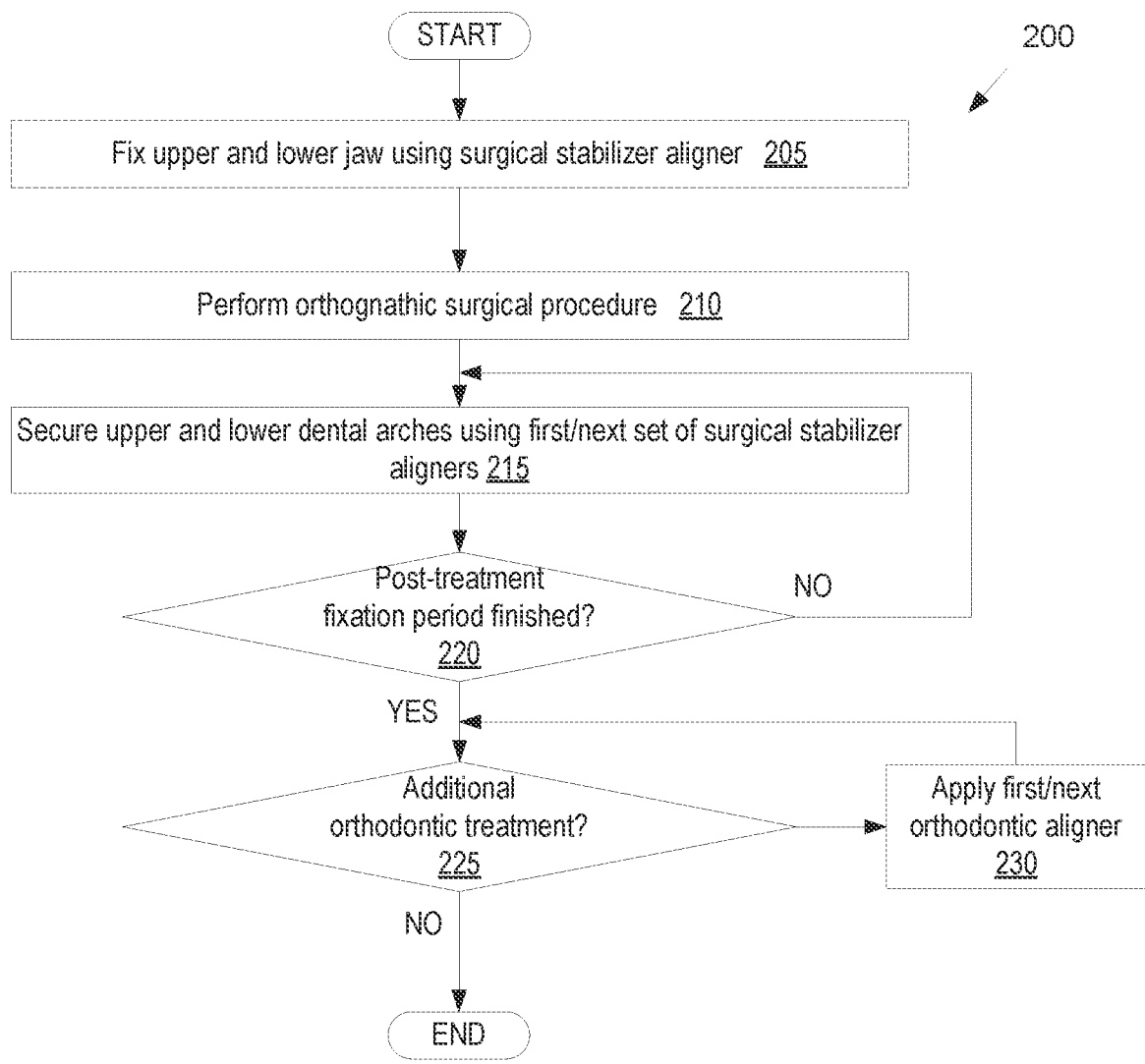
FIG. 2 illustrates a flow diagram for a method of securing a jaw after orthognathic surgery using surgical stabilizer aligners, in accordance with one embodiment.

FIG. 2 illustrates a flow diagram for a method 200 of securing a jaw after orthognathic surgery using surgical stabilizer aligners, in accordance with one embodiment. In one embodiment, at block 205 the upper and lower jaw are fixed using a pair of surgical stabilizer aligners during surgery. The upper and lower stabilizer aligners may be worn by a patient during surgery, and may hold the jaw in a target position and orientation. The stabilizer aligners may create a relationship between the upper and lower jaw that a surgeon desires.

At block 210, a surgeon performs orthognathic surgery on the patient. The surgery may or may not be performed while the patient wears a pair of surgical stabilizer aligners. Notably, orthodontic movements and arch coordination are not achieved via pre-operative orthodontic treatment because the arches are stabilized by stabilizing features in the stabilizer aligners rather than tooth surfaces.

At block 215, the upper and lower dental arches are secured during a post-operative fixation period using a set of surgical stabilizer aligners. The surgical stabilizer aligners are secured together and/or to a skeleton using rubber bands or elastics or other force delivery device. The stabilizer aligners fix the position of the upper and lower jaw and also apply forces to the teeth in the upper and lower jaw to begin orthodontic treatment during the post-operative fixation period. Accordingly, the stabilizing features of the aligners act as a splint. Light elastic forces engaged between the upper and lower aligner provide sufficient force to hold the jaws in the closed position. The feature surfaces are oriented to work in unison to hold the position of the mandible or maxilla and resist any movement (lateral, anteroposterior, and vertical).

At block 220, a determination is made as to whether the post-treatment fixation period is finished when it is time to apply a next set of aligners. The fixation period typically lasts about 3-12 weeks. If the post-treatment fixation period is not finished, the method returns to block 215, and a next set of stabilizer aligners are applied to the patient's upper and lower dental arches to maintain the same target position and orientation of the upper and lower jaws. At the same time, the next set of stabilizer aligners have a different tooth positions and/or orientations to apply new forces to the teeth and further reposition those teeth. During the fixation period rapid tooth movement may be achieved by taking advantage of the heightened cellular/tissue response to the surgery. Accordingly, the aligners may be changed every 2-3 days during the post-treatment fixation period. If the post-treatment fixation period is finished, the method proceeds to block 225.

At block 225, a determination is made as to whether additional orthodontic treatment is to be performed. If so, then a standard orthodontic aligner is applied to the patient's upper and/or lower arches at block 230. The method then returns to block 225. Standard orthodontic treatment may then continue until a final treatment goal is achieved. The method may then end when the final treatment goal is achieved.

Figure 3A:
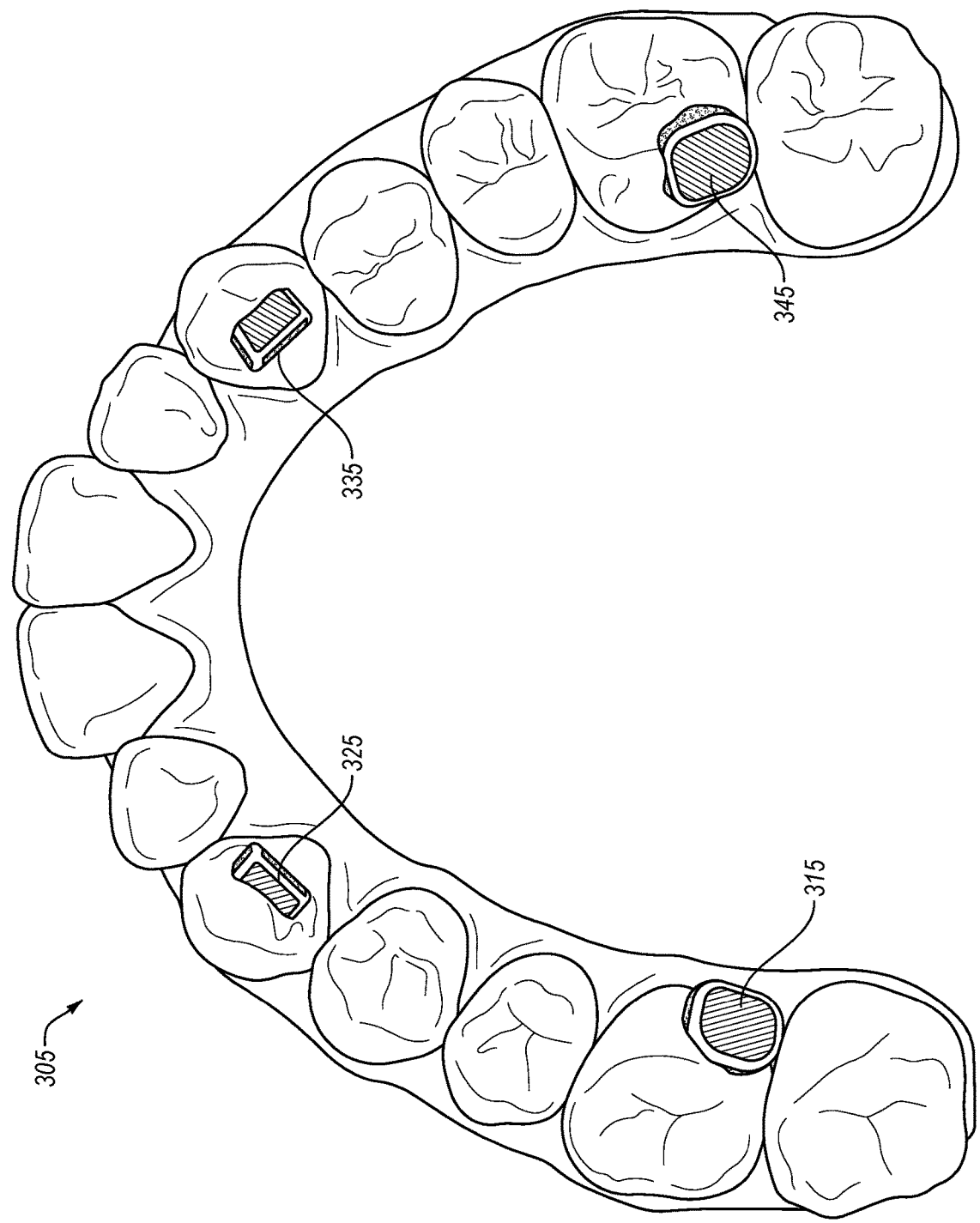
FIGS. 3A-3E illustrate digital models of upper and lower dental arches with attached stabilizing features, in accordance with one embodiment.
Figure 3B:
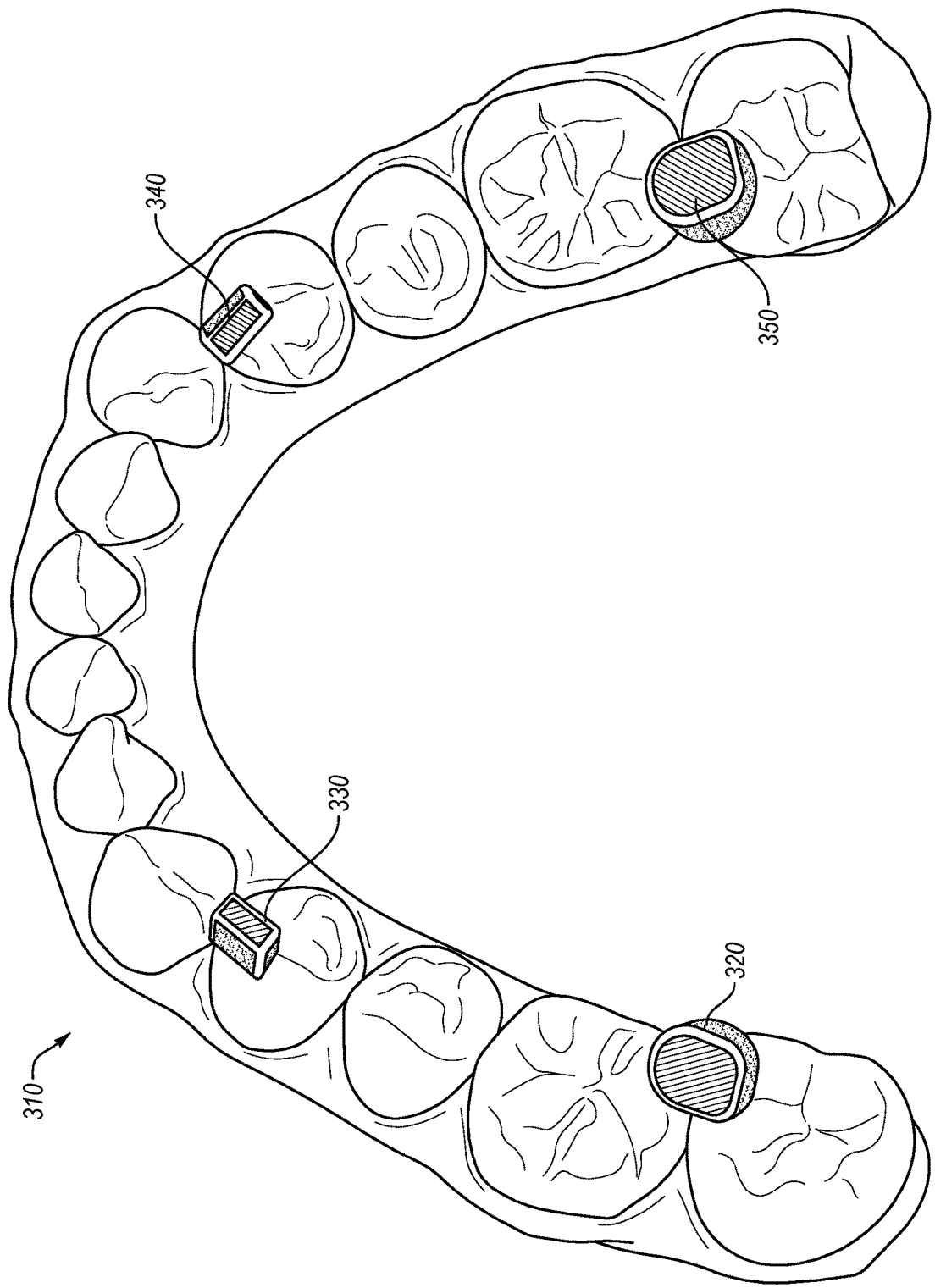
Figure 3C:
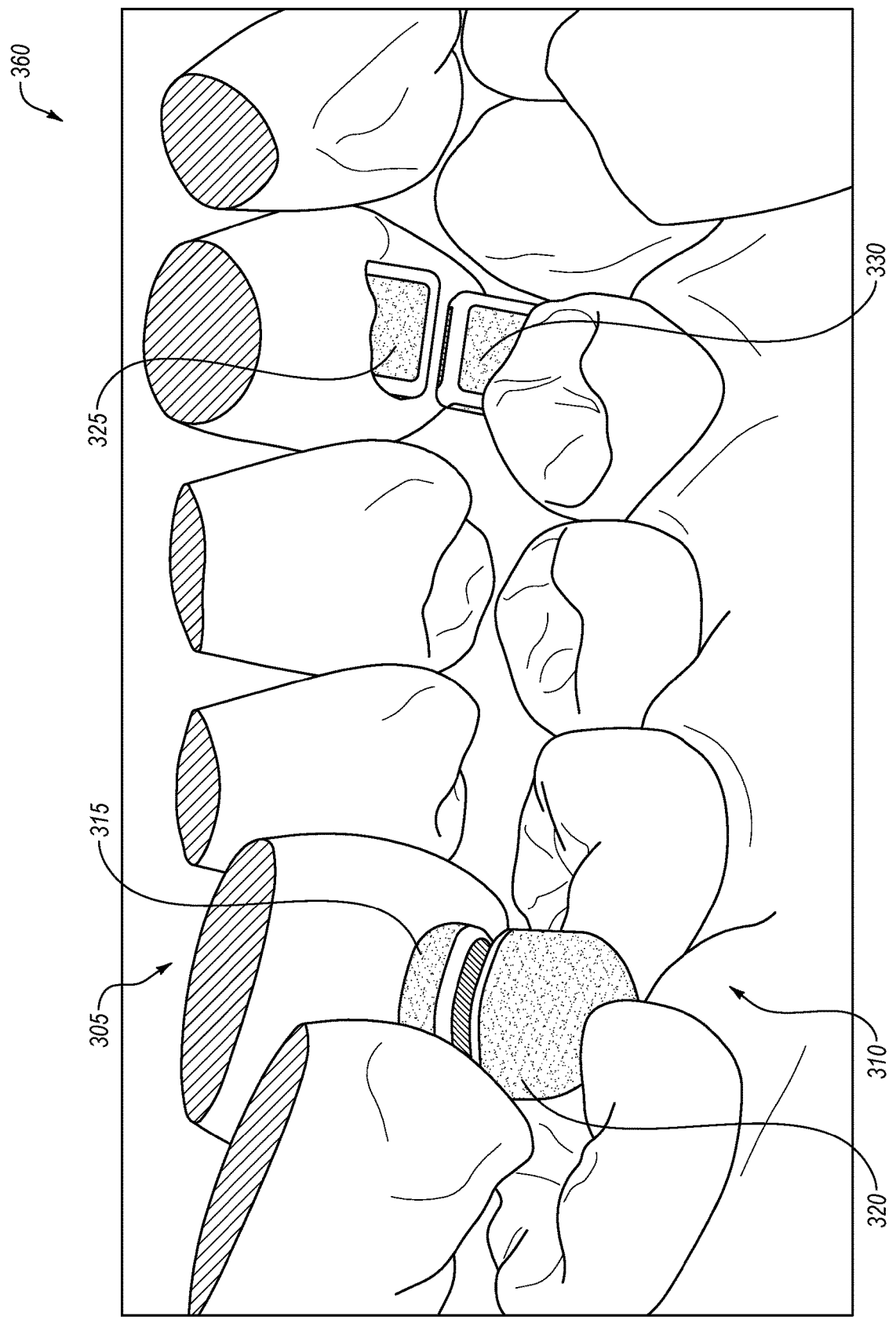
Figure 3D:
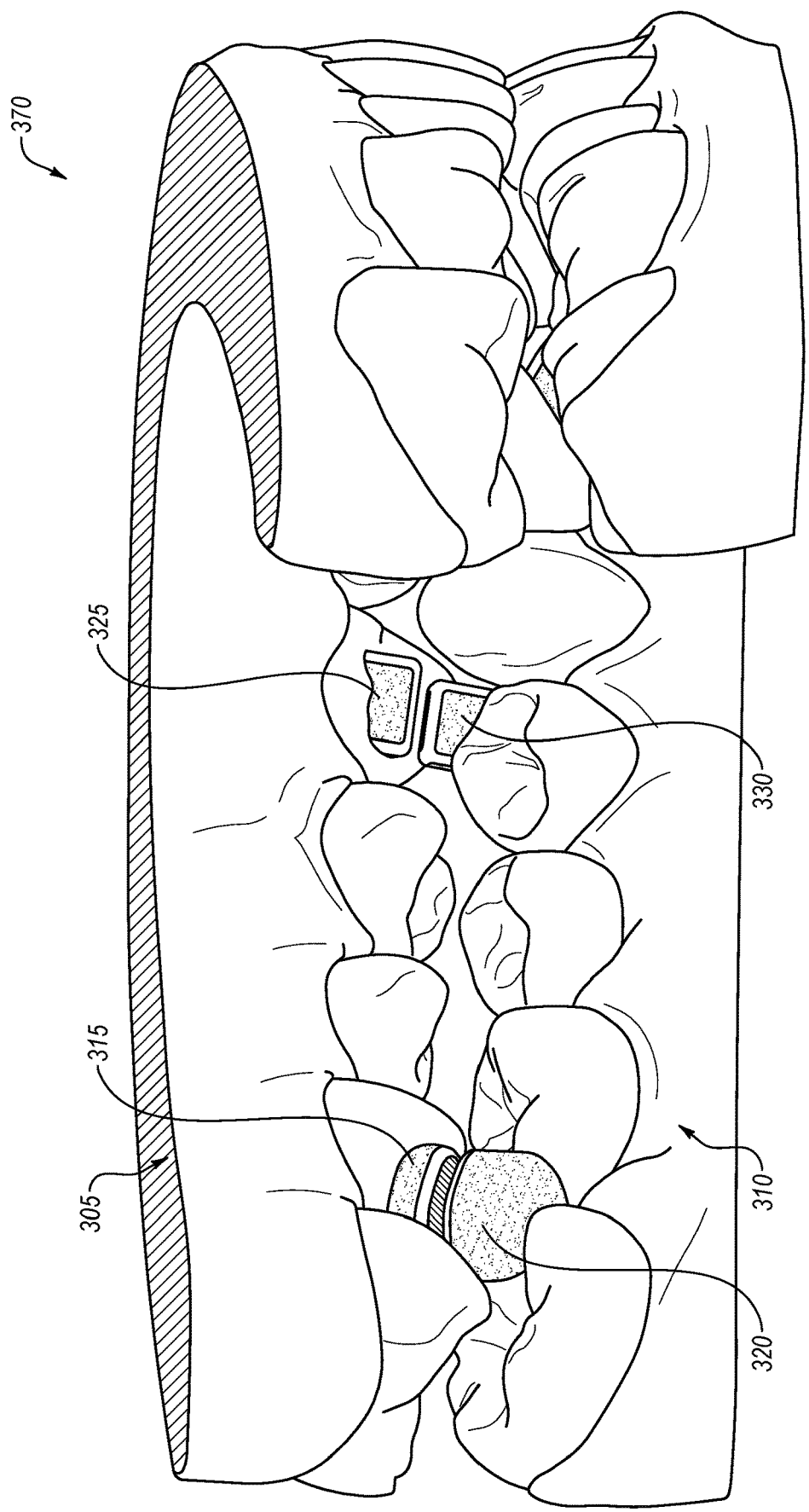
Figure 3E:
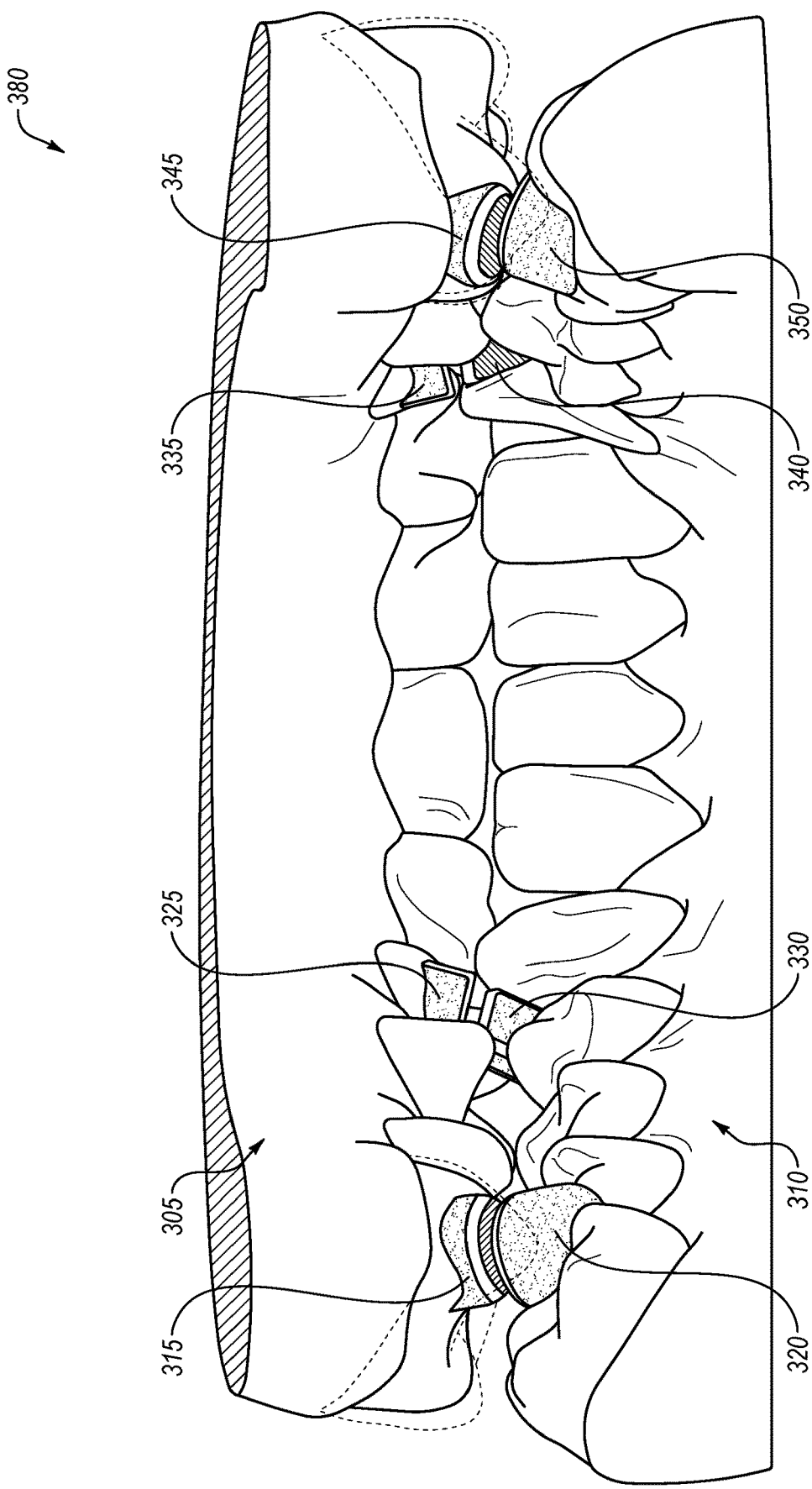

FIGS. 3A-3E illustrate digital models of an upper dental arch 305 and a lower dental arch 310 with attached stabilizing features, in accordance with one embodiment. The upper dental arch 305 includes stabilizing features 315, 325, 335 and 345. The lower dental arch 310 includes stabilizing features 320, 330, 340 and 350. As shown in FIGS. 3C-3E, stabilizing feature 315 engages with stabilizing feature 320 (forming a pair of opposing stabilizing features), stabilizing feature 325 engages with stabilizing feature 330 (forming another pair of opposing stabilizing features), stabilizing feature 335 engages with stabilizing feature 340, and stabilizing feature 345 engages with stabilizing feature 350.

Figure 4A:
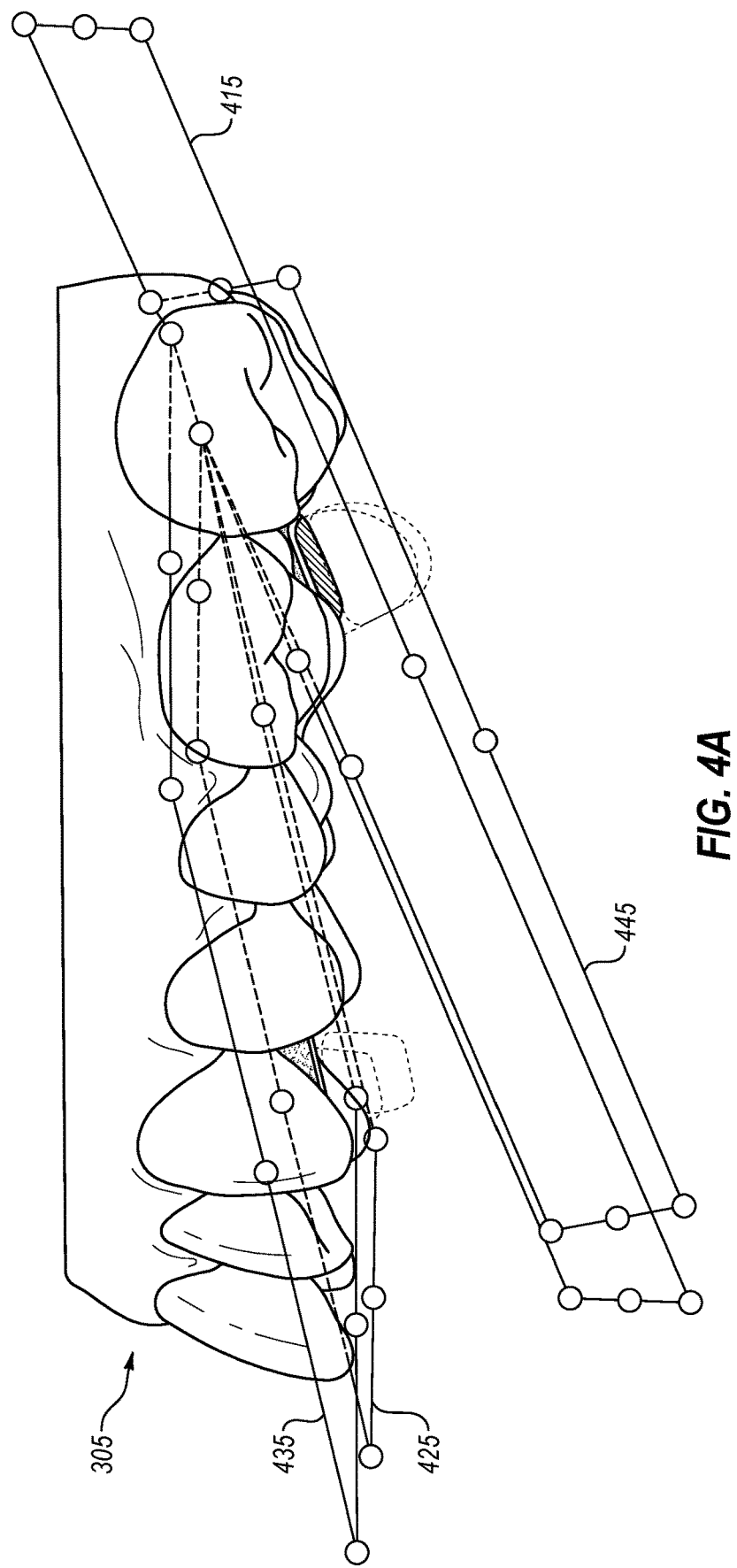
FIGS. 4A-4C illustrate digital models of upper and lower dental arches with attached stabilizing features and contact planes of the stabilizing features, in accordance with one embodiment.
Figure 4B:
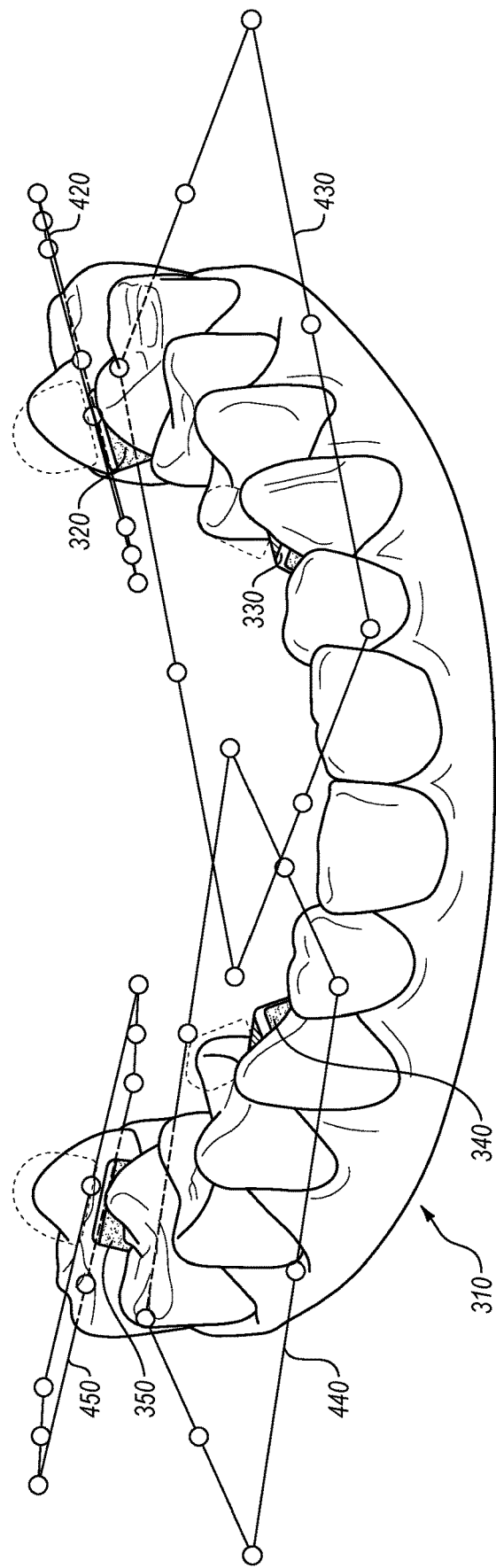
Figure 4C:
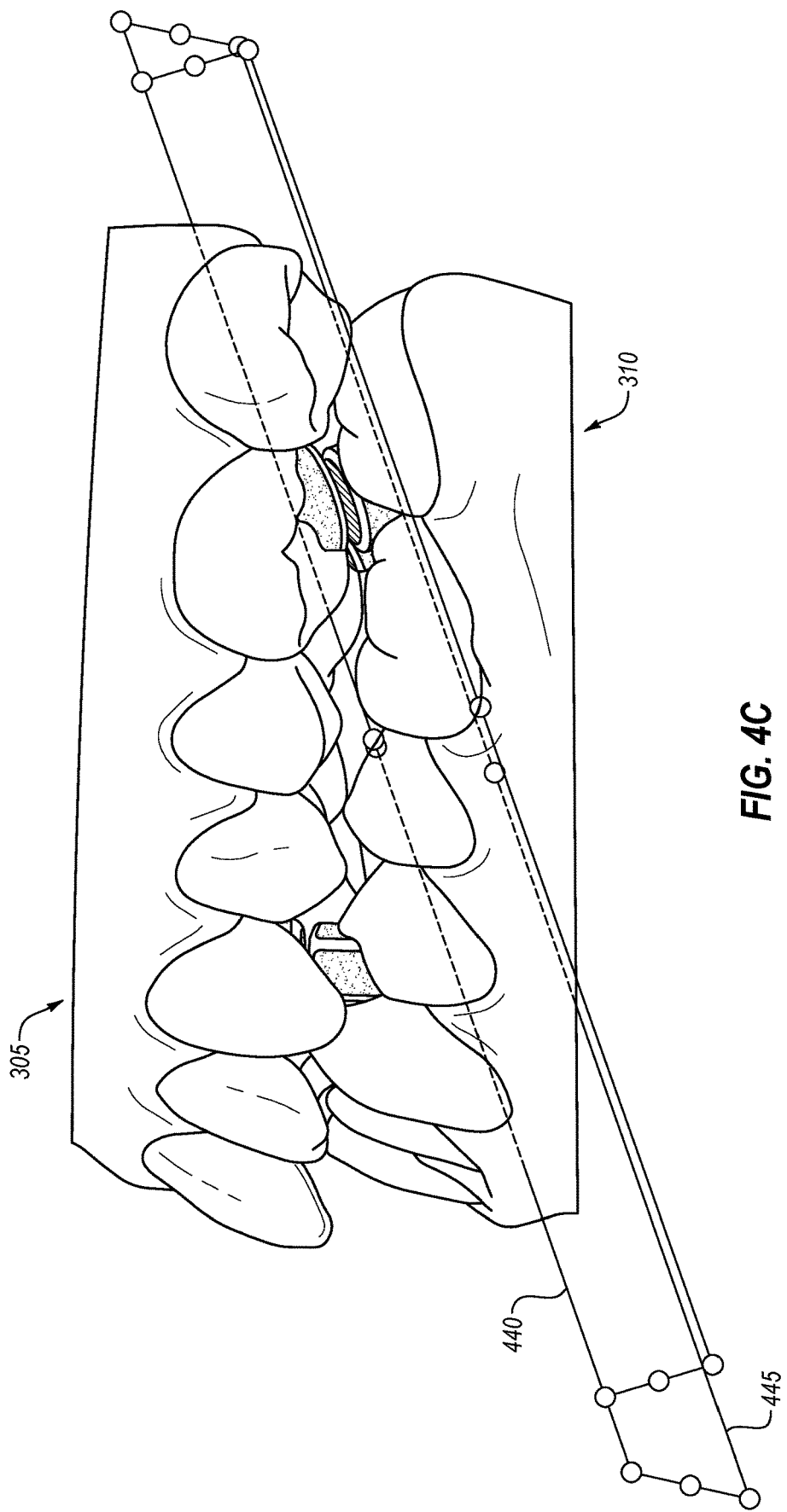

FIGS. 4A-4C illustrate digital models of an upper dental arch 305 and a lower dental arch 310 with attached stabilizing features and contact planes of the stabilizing features, in accordance with one embodiment. In FIG. 4A contact planes 415, 425, 435 and 445 are shown for stabilizing features 315, 325, 335 and 345, respectively. In FIG. 4B, contact planes 420, 430, 440 and 450 are shown for stabilizing features 320, 330, 340 and 350, respectively. As shown, vectors normal to the contact planes in a dental arch all have transverse sagittal and vertical components. Additionally, the contact planes in a dental arch do not share common rotation axes. Moreover, the vectors normal to the contact planes in a dental arch are not collinear. In FIG. 4C, the contact planes 440, 445 of engaging stabilizing features between the upper arch 305 and lower arch 310 are shown.

Figure 5:
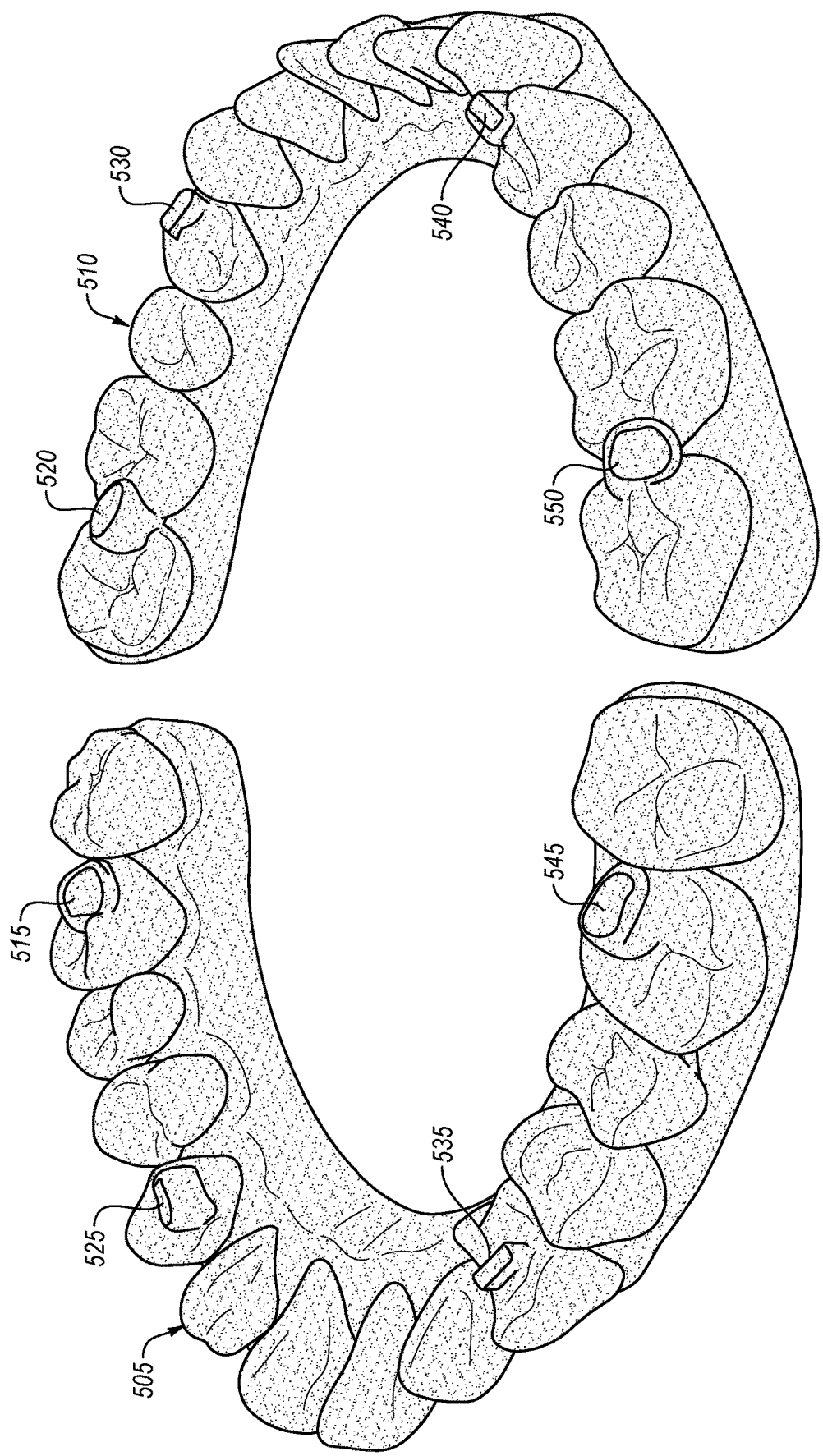
FIG. 5 illustrates a mold of an upper and lower dental arch with stabilizing features, in accordance with another embodiment.

FIG. 5 illustrates a mold of an upper dental arch 505 and a lower dental arch 510 with stabilizing features, in accordance with another embodiment. The upper arch 505 includes stabilizing features 515, 525, 535 and 545. The lower arch 510 includes stabilizing features 520, 530, 540 and 550.

Figure 6:
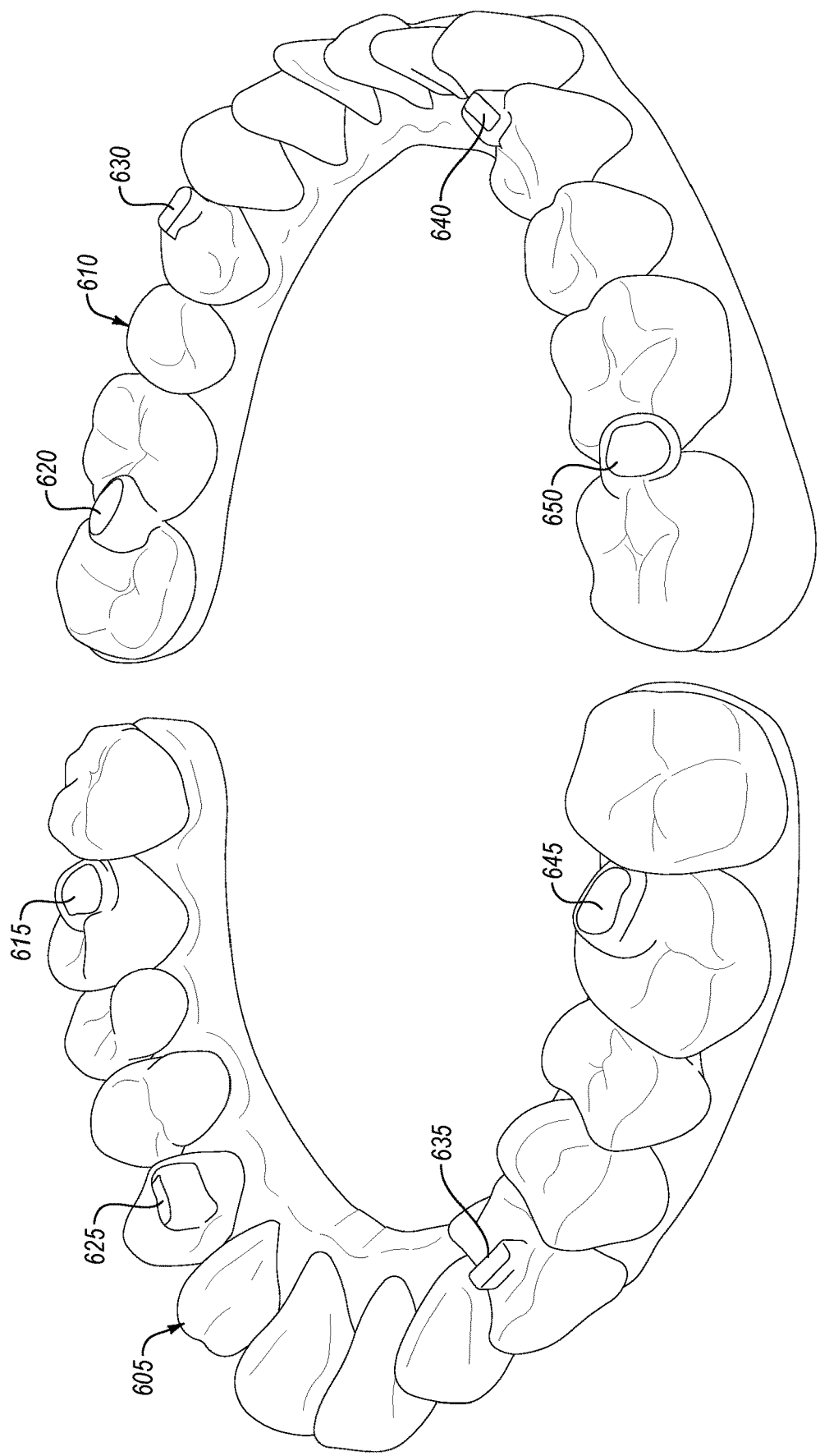
FIG. 6 illustrates a set of plastic shells (stabilizer aligners) for an upper and lower dental arch with stabilizing features, in accordance with another embodiment.

FIG. 6 illustrates a set of plastic shells (stabilizer aligners) for an upper and lower dental arch with stabilizing features, in accordance with another embodiment. A first plastic shell 605 for an upper dental arch includes stabilizing features 615, 625, 635 and 645, and was formed over the mold of upper dental arch 505. A second plastic shell 610 for a lower dental arch includes stabilizing features 620, 630, 640 and 650, and was formed over the mold of lower dental arch 510.

The first plastic shell 605 includes a first set of cavities that conform to a dentition of the upper dental arch of a patient at a first stage of treatment and further includes a first set of stabilizing features (including stabilizing features 615, 625, 635 and 645). The second plastic shell 610 includes a second set of cavities that conform to a dentition of the lower dental arch of the patient at the first stage of treatment and further includes a second set of stabilizing features (including stabilizing features 620, 630, 640 and 650). The stabilizing features 620, 630, 640 and 650 in the second set of stabilizing features are configured to contact opposing stabilizing features in the first set of stabilizing features 615, 625, 635 and 645. Each pair of opposing stabilizing features may contact at a surface (surface contact), may contact at a line (line contact), or may contact at a point (point contact).

The first plastic shell 605 (upper stabilizer aligner) and the second plastic shell 610 (lower stabilizer aligner) are configured to prevent jaw movement of the patient while the upper stabilizer aligner is worn on the upper dental arch of the patient, the lower stabilizer aligner is worn on the lower dental arch of the patient, and the upper stabilizer aligner is engaged with the lower stabilizer aligner. Jaw movement of the patient is prevented based on stabilizing features in the first set of stabilizing features being configured with different planes of orientation that in the aggregate prevent rigid body motion. The first set of stabilizing features and the second set of stabilizing features may be shaped and positioned such that in combination they resist motion in at least three planes.

Each stabilizing feature 615, 625, 635, 645 is to contact an opposing stabilizing feature 620, 630, 640, 650. In one embodiment, for each pair of opposing stabilizing features, a vector normal to a surface at a point of contact between the pair of opposing stabilizing features comprises a transverse component, a sagittal component and a vertical component.

For each pair of opposing stabilizing features, a rotation axis is defined by a vector normal to a surface at a point of contact between the pair of opposing stabilizing features. In one embodiment, no pair of opposing stabilizing features shares a common rotation axis with any other pair of opposing stabilizing features and no pair of opposing stabilizing features has a vector that is collinear with a vector of any other pair of opposing stabilizing features.

Though not shown, the first plastic shell 605 may have a first elastic retention feature (e.g., first precision cut) and the second plastic shell 610 may have a second elastic retention feature (e.g., a second precision cut). The first elastic retention feature is configured to receive a first end of an elastic, the second elastic retention feature is configured to receive a second end of the elastic, and the elastic is to pull the upper stabilizer aligner against the lower stabilizer aligner to immobilize the jaw of the patient.

Figure 7:
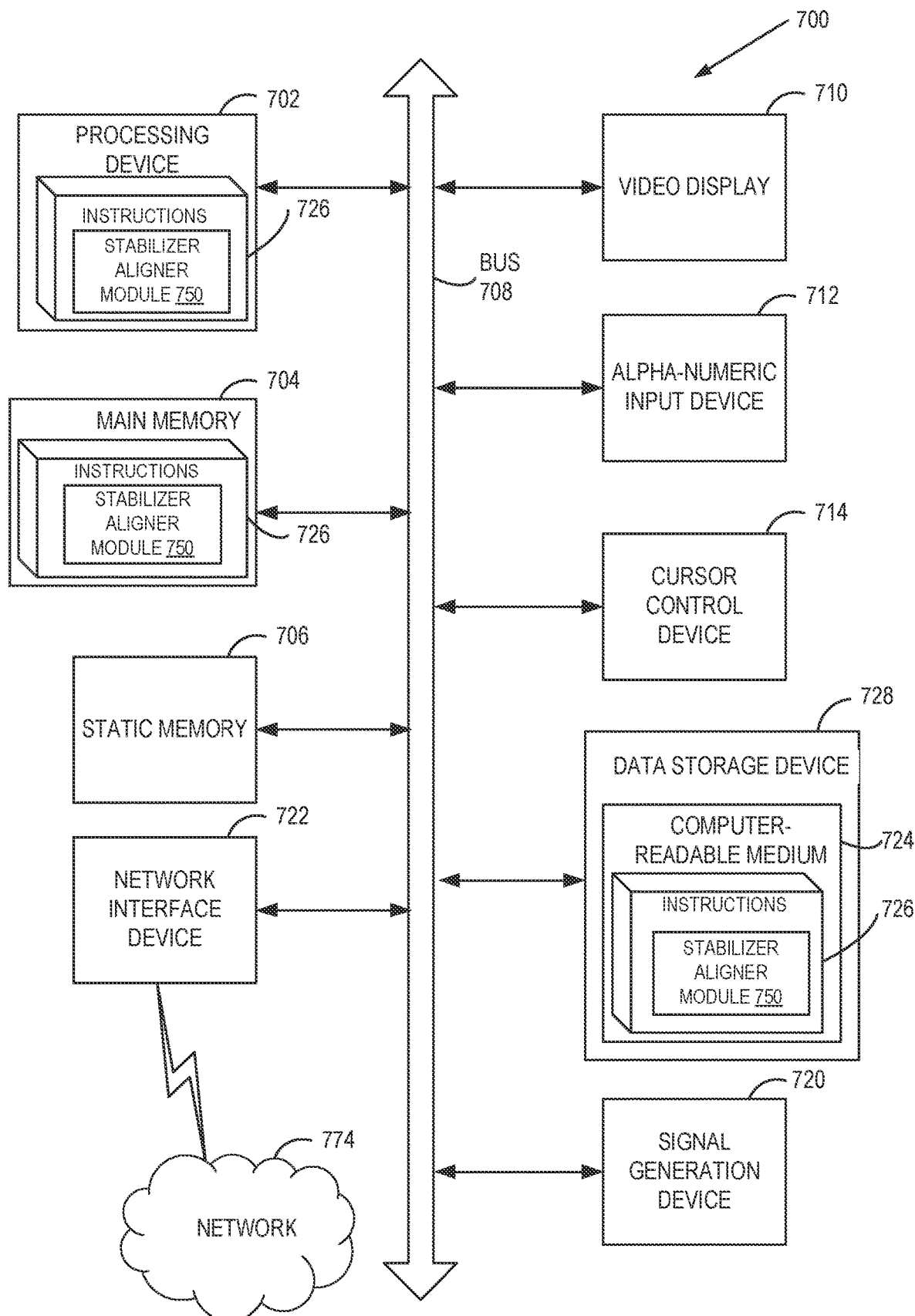
FIG. 7 illustrates a block diagram of an example computing device, in accordance with embodiments of the present invention.

FIG. 7 illustrates a diagrammatic representation of a machine in the example form of a computing device 700 within which a set of instructions, for causing the machine to perform any one or more of the methodologies discussed with reference to the methods of FIGS. 1A-1B. In alternative embodiments, the machine may be connected (e.g., networked) to other machines in a Local Area Network (LAN), an intranet, an extranet, or the Internet. For example, the machine may be networked to a rapid prototyping apparatus such as a 3D printer or SLA apparatus. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 700 includes a processing device 702, a main memory 704 (e.g., read-only memory (ROM), flash memory, dynamic random access memory (DRAM) such as synchronous DRAM (SDRAM), etc.), a static memory 706 (e.g., flash memory, static random access memory (SRAM), etc.), and a secondary memory (e.g., a data storage device 728), which communicate with each other via a bus 708.

Processing device 702 represents one or more general-purpose processors such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. Processing device 702 is configured to execute the processing logic (instructions 726) for performing operations and steps discussed herein.

The computing device 700 may further include a network interface device 722 for communicating with a network 764. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker).

The data storage device 728 may include a machine-readable storage medium (or more specifically a non-transitory computer-readable storage medium) 724 on which is stored one or more sets of instructions 726 embodying any one or more of the methodologies or functions described herein. A non-transitory storage medium refers to a storage medium other than a carrier wave. The instructions 726 may also reside, completely or at least partially, within the main memory 704 and/or within the processing device 702 during execution thereof by the computer device 700, the main memory 704 and the processing device 702 also constituting computer-readable storage media.

The computer-readable storage medium 724 may also be used to store one or more virtual 3D models (also referred to as electronic models) and/or a mold generator 750, which may perform one or more of the operations of methods 100 and 125 described with reference to FIGS. 1A-1B. The computer readable storage medium 724 may also store a software library containing methods that call a stabilizer aligner module 750. While the computer-readable storage medium 724 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

It is to be understood that the above description is intended to be illustrative, and not restrictive. Many other embodiments will be apparent upon reading and understanding the above description. Although embodiments of the present invention have been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A set of stabilizer aligners, comprising:
a first upper stabilizer aligner for an upper dental arch of a patient, the first upper stabilizer aligner comprising:
a first set of cavities that conform to a dentition of the upper dental arch of the patient at a first stage of treatment; and
a first set of at least three stabilizing features, wherein each stabilizing feature of the first set is a projection from the first upper stabilizer aligner that consists of a single planar upper contact surface; and
a first lower stabilizer aligner for a lower dental arch of the patient, the first lower stabilizer aligner comprising:
a second set of cavities that conform to a dentition of the lower dental arch of the patient at the first stage of treatment; and
a second set of at least three stabilizing features, wherein each stabilizing feature of the second set is a projection from the first lower stabilizer aligner that consists of a single planar lower contact surface;
wherein stabilizing features in the second set of stabilizing features are configured to contact opposing stabilizing features in the first set of stabilizing features to form a plurality of pairs of opposing stabilizing features, each pair of opposing stabilizing features comprising a first stabilizing feature of the first set of stabilizing features and a second stabilizing feature of the second set of stabilizing features, wherein each pair of opposing stabilizing features has an axis of rotation defined by a vector normal to the planar upper contact surface and the planar lower contact surface at a contact point between the planar upper contact surface of the first stabilizing feature and the planar lower contact surface of the second stabilizing feature of the pair of opposing stabilizing features, wherein no two pairs of opposing stabilizing features have a common axis of rotation or a collinear axis of rotation; and
wherein the first upper stabilizer aligner and the first lower stabilizer aligner are configured to prevent jaw movement of the patient while the first upper stabilizer aligner is worn on the upper dental arch, the first lower stabilizer aligner is worn on the lower dental arch, and the first upper stabilizer aligner is engaged with the first lower stabilizer aligner based on shapes and positions of the first set of stabilizing features relative to shapes and positions of the second set of stabilizing features.

2. The set of stabilizer aligners of claim 1, further comprising:
a first anchor for an elastic in the first upper stabilizer aligner; and
a second anchor for the elastic in the first lower stabilizer aligner;
wherein the first anchor is to receive a first end of the elastic, the second anchor is to receive a second end of the elastic, and the elastic is to pull the first upper stabilizer aligner against the first lower stabilizer aligner; and
wherein the plurality of pairs of opposing stabilizing features in combination with application of the elastic to the first anchor and the second anchor immobilizes a jaw of the patient.

3. The set of stabilizer aligners of claim 1, further comprising:
a second upper stabilizer aligner for the upper dental arch, the second upper stabilizer aligner comprising:
a third set of cavities that conform to a dentition of the upper dental arch of the patient at a second stage of treatment; and
a third set of stabilizing features; and
a second lower stabilizer aligner for the lower dental arch, the second lower stabilizer aligner comprising:
a fourth set of cavities that conform to a dentition of the lower dental arch of the patient at the second stage of treatment; and
a fourth set of stabilizing features;
wherein stabilizing features in the third set of stabilizing features are configured to contact opposing stabilizing features in the fourth set of stabilizing features, and wherein the third set of stabilizing features and the fourth set of stabilizing features are smaller than the first set of stabilizing features and the second set of stabilizing features.

4. The set of stabilizer aligners of claim 1, wherein the first set of stabilizing features and the second set of stabilizing features are shaped and positioned such that during closure of a jaw of the patient a first pair of opposing stabilizing features first comes into contact, contact of the first pair of opposing stabilizing features guides a second pair of opposing stabilizing features into a correct contact, and the correct contact of the second pair of opposing stabilizing features guides a third pair of opposing stabilizing features into a correct contact.

5. The set of stabilizer aligners of claim 4, wherein the first pair of opposing stabilizing features has a lower level of stability than the second pair of opposing stabilizing features or the third pair of opposing stabilizing features.

6. The set of stabilizer aligners of claim 1, wherein:
for each pair of opposing stabilizing features, the pair of opposing stabilizing features is configured such that the vector normal to the planar upper contact surface and the planar lower contact surface at the contact point between the pair of opposing stabilizing features comprises a component along a transverse axis, a component along a sagittal axis and a component along a vertical axis.

7. The set of stabilizer aligners of claim 1, wherein at least one of a) the first upper stabilizer aligner is shaped to apply forces to one or more teeth in the upper dental arch or b) the first lower stabilizer aligner is shaped to apply forces to one or more teeth in the lower dental arch.

8. A set of stabilizer aligners, comprising:
an upper stabilizer aligner for an upper dental arch of a patient for a treatment stage of orthodontic treatment, the upper stabilizer aligner comprising:
a first set of cavities that conform to a dentition of the upper dental arch of the patient at the treatment stage; and
a first set of at least three stabilizing features, wherein each stabilizing feature of the first set is a projection from the upper stabilizer aligner that consists of a single planar upper contact surface; and
a lower stabilizer aligner for a lower dental arch of the patient for the treatment stage of the orthodontic treatment, the lower stabilizer aligner comprising:
a second set of cavities that conform to a dentition of the lower dental arch of the patient at the treatment stage; and
a second set of at least three stabilizing features, wherein each stabilizing feature of the second set is a projection from the lower stabilizer aligner that consists of a single planar lower contact surface;
wherein while the upper stabilizer aligner and the lower stabilizer aligner are worn by the patient, the first set of stabilizing features opposes the second set of stabilizing features to create a plurality of pairs of opposing stabilizing features, each pair of opposing stabilizing features comprising a first stabilizing feature of the first set of stabilizing features and a second stabilizing feature of the second set of stabilizing features, wherein each pair of opposing stabilizing features has an axis of rotation defined by a vector normal to the planar upper contact surface and the planar lower contact surface at a contact point between the planar upper contact surface of the first stabilizing feature and the planar lower contact surface of the second stabilizing feature of the pair of opposing stabilizing features, wherein no two pairs of opposing stabilizing features have a common axis of rotation or a collinear axis of rotation, and wherein the plurality of pairs of opposing stabilizing features prevent jaw movement of a lower jaw comprising the lower dental arch relative to an upper jaw comprising the upper dental arch in at least three planes while the first set of at least three stabilizing features are engaged with the second set of at least three stabilizing features based on shapes and positions of the first set of stabilizing features relative to shapes and positions of the second set of stabilizing features.

9. The set of stabilizer aligners of claim 8, further comprising:
a first anchor, in the upper stabilizer aligner, for an elastic; and
a second anchor, in the lower stabilizer aligner, for the elastic;
wherein the first anchor is to receive a first end of the elastic, the second anchor is to receive a second end of the elastic, and the elastic is to pull the upper stabilizer aligner against the lower stabilizer aligner; and
wherein the plurality of pairs of opposing stabilizing features in combination with application of the elastic to the first anchor and the second anchor immobilizes a jaw of the patient.

10. The set of stabilizer aligners of claim 8, wherein the first set of stabilizing features and the second set of stabilizing features are shaped and positioned such that during closure of a jaw of the patient a first pair of opposing stabilizing features of the plurality of pairs of opposing stabilizing features first comes into contact, contact of the first pair of opposing stabilizing features guides a second pair of opposing stabilizing features of the plurality of pairs of opposing stabilizing features into a correct contact, and the correct contact of the second pair of opposing stabilizing features guides a third pair of opposing stabilizing features of the plurality of pairs of stabilizing features into a correct contact.

11. The set of stabilizer aligners of claim 10, wherein the first pair of opposing stabilizing features has a lower level of stability than the second pair of opposing stabilizing features or the third pair of opposing stabilizing features.

12. The set of stabilizer aligners of claim 8, wherein for each pair of opposing stabilizing features, the pair of opposing stabilizing features is configured such that the vector normal to the planar upper contact surface and the planar lower contact surface at the contact point between the pair of opposing stabilizing features comprises a component along a transverse axis component, a component along a sagittal component axis and a component along a vertical axis component.

13. A set of stabilizer aligners, comprising:
an upper stabilizer aligner for an upper dental arch of a patient, the upper stabilizer aligner comprising:
means for securing the upper stabilizer aligner to the upper dental arch of the patient;
means for adjusting one or more teeth of the patient on the upper dental arch; and
a first set of at least three stabilizing features, wherein each stabilizing feature of the first set is a projection from the upper stabilizer aligner that consists of a single planar upper contact surface; and
a lower stabilizer aligner for a lower dental arch of the patient, the lower stabilizer aligner comprising:
means for securing the lower stabilizer aligner to the lower dental arch of the patient;
means for adjusting one or more teeth of the patient on the lower dental arch; and
a second set of at least three stabilizing features, wherein each stabilizing feature of the second set is a projection from the lower stabilizer aligner that consists of a single planar lower contact surface;
wherein while the upper stabilizer aligner and the lower stabilizer aligner are worn by the patient, the first set of stabilizing features opposes the second set of stabilizing features to create a plurality of pairs of opposing stabilizing features, each pair of opposing stabilizing features comprising a first stabilizing feature of the first set of stabilizing features and a second stabilizing feature of the second set of stabilizing features, wherein each pair of opposing stabilizing features has an axis of rotation defined by a vector normal to the planar upper contact surface and the planar lower contact surface at a contact point between the planar upper contact surface of the first stabilizing feature and the planar lower contact surface of the second stabilizing feature of the pair of opposing stabilizing features, wherein no two pairs of opposing stabilizing features have a common axis of rotation or a collinear axis of rotation, and wherein the plurality of pairs of opposing stabilizing features prevent jaw movement of a lower jaw comprising the lower dental arch relative to an upper jaw comprising the upper dental arch in at least three planes while the first set of stabilizing features are engaged with the second set of stabilizing features based on shapes and positions of the first set of stabilizing features relative to shapes and positions of the second set of stabilizing features.

\* \* \* \* \*